(12) United States Patent
Seo et al.

(10) Patent No.: US 9,037,186 B2
(45) Date of Patent: May 19, 2015

(54) METHOD FOR CONTROLLING SIGNAL TRANSMISSION POWER AND DEVICE FOR SAME

(71) Applicant: LG ELECTRONICS INC., Seoul (KR)

(72) Inventors: Dong Youn Seo, Anyang-si (KR); Ki Jun Kim, Anyang-si (KR); Joon Kui Ahn, Anyang-si (KR); Min Gyu Kim, Anyang-si (KR); Jung Hoon Lee, Anyang-si (KR); Dae Won Lee, Anyang-si (KR); Suck Chel Yang, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/452,394

(22) Filed: Aug. 5, 2014

(65) Prior Publication Data

US 2014/0349703 A1   Nov. 27, 2014

Related U.S. Application Data

(63) Continuation of application No. 13/143,824, filed as application No. PCT/KR2010/000510 on Jan. 28, 2010, now Pat. No. 8,818,442.

(60) Provisional application No. 61/148,368, filed on Jan.
(Continued)

(30) Foreign Application Priority Data

Jan. 27, 2010  (KR) .................. 10-2010-0007528

(51) Int. Cl.
*H04B 7/00* (2006.01)
*H04W 52/14* (2009.01)
(Continued)

(52) U.S. Cl.
CPC ............ *H04W 52/146* (2013.01); *H04W 52/34* (2013.01); *H04W 52/367* (2013.01); *H04W 88/10* (2013.01); *Y02B 60/50* (2013.01); *H04W 52/30* (2013.01); *H04W 52/346* (2013.01)

(58) Field of Classification Search
CPC ... H04W 52/30; H04W 52/34; H04W 52/346; H04W 52/367
USPC ............... 455/522, 67.11, 68–70, 115.3, 126, 455/127.1, 127.2, 135, 226.3, 277.2, 296; 370/318
See application file for complete search history.

(56) References Cited

U.S. PATENT DOCUMENTS 6,940,839 B2   9/2005   Miyamoto
7,126,922 B2   10/2006  Zhang
(Continued)

FOREIGN PATENT DOCUMENTS

CN   1695335 A   11/2005
CN   1716837 A   1/2006
(Continued)

OTHER PUBLICATIONS

NTT Docomo, "UL Transmission Bandwidth in LTE-Advanced", 3GPP TSG RAN WG1 Meeting #54bis, R1-083683, Sep. 29-Oct. 3, 2008, pp. 1-3.
(Continued)

*Primary Examiner* — Dominic E Rego
(74) *Attorney, Agent, or Firm* — Birch, Stewart, Kolasch & Birch, LLP

(57) ABSTRACT

A method of transmitting signals including determining, per each of the component carriers, transmission power of at least one channel for simultaneous transmission, in such a way that a total transmission power of the at least one channel does not exceed a maximum transmission power configured for a corresponding component carrier; and checking whether a total transmission power of channels over the multiple component carriers for the simultaneous transmission exceeds a total maximum transmission power configured for the communication apparatus or not. If the total transmission power of the channels exceeds the total maximum transmission power configured for the communication apparatus, transmission power of at least one PUSCH among the channels is adjusted in such a way that an adjusted total transmission power over the multiple component carriers does not exceed the total maximum transmission power.

16 Claims, 13 Drawing Sheets

Related U.S. Application Data 29, 2009, provisional application No. 61/229,280, filed on Jul. 29, 2009, provisional application No. 61/246,489, filed on Sep. 28, 2009, provisional application No. 61/255,868, filed on Oct. 29, 2009, provisional application No. 61/286,380, filed on Dec. 15, 2009.

(51) Int. Cl.
*H04W 52/36* (2009.01)
*H04W 52/34* (2009.01)
*H04W 88/10* (2009.01)
*H04W 52/30* (2009.01)

(56) References Cited

U.S. PATENT DOCUMENTS

| | | |
|---|---|---|
| 8,160,029 B2 | 4/2012 | Dominique et al. |
| 2002/0001292 A1 | 1/2002 | Miyamoto |
| 2002/0077111 A1 | 6/2002 | Spaling et al. |
| 2005/0111391 A1 | 5/2005 | Oki et al. |
| 2006/0003787 A1 | 1/2006 | Heo et al. |
| 2006/0135194 A1 | 6/2006 | Rensburg et al. |
| 2006/0189282 A1 | 8/2006 | Hasegawa et al. |
| 2007/0010269 A1 | 1/2007 | Azuma |
| 2007/0015476 A1 | 1/2007 | Akbar Attar et al. |
| 2007/0253320 A1 | 11/2007 | Yu et al. |
| 2008/0227479 A1 | 9/2008 | Iwata |
| 2009/0154403 A1 | 6/2009 | Niwano |
| 2010/0087202 A1 | 4/2010 | Ventola et al. |
| 2010/0215017 A1 | 8/2010 | Li et al. |

FOREIGN PATENT DOCUMENTS

| | | |
|---|---|---|
| CN | 101123599 A | 2/2008 |
| CN | 101170331 A | 4/2008 |
| CN | 101340413 A | 1/2009 |
| JP | 2007-19594 A | 1/2007 |
| KR | 10-2006-0064918 A | 6/2006 |

OTHER PUBLICATIONS

Asustek, "Multi-carrier UL Power Control for LTE-A," 3GPP TSG RAN WG1 Meeting #58, R1-093282, Shenzhen, China, Aug. 24-28, 2009, 3 pages.

Ericsson et al., "Uplink Power Control for Carrier Aggregation," 3GPP TSG RAN WG1 Meeting #58bis, R1-094274, Miyazaki, Japan, Oct. 12-16, 2009, 4 pages.

LG Electronics, "Basic UL Power Control Methods in LTE-Advanced," 3GPP TSG RAN WGl #59bis, R1-100216, Valencia, Spain, Jan. 18-22, 2010, pp. 1-5.

LG Electronics, "UCI Piggyback onto PUSCH in LTE-Advanced for CM Preserving Transmission," 3GPP TSG RAN WG1 #59, R1-094469, Jeju, Korea, Nov. 9-13, 2009, 3 pages.

Nokia Siemens Networks et al., "PUSCH Power Control for LTE-Advanced," 3GPP TSG RAN WG1 #57bis Meeting, R1-092574, Los Angeles, USA, Jun. 29-Jul. 3, 2009, 4 pages.

Nokia Siemens Networks et al., "Uplink Power Control for LTE-Advanced," 3GPP TSG RAN WG1 #58bis Meeting, R1-093906, Miyazaki, Japan, Oct. 12-16, 2009, 4 pages.

Samsung, "UL Transmission Power Control in LTE-A," 3GPP TSG RAN WG1 #56bis, R1-091250, Seoul, Korea, Mar. 23-27, 2009, pp. 1-5.

FIG. 2
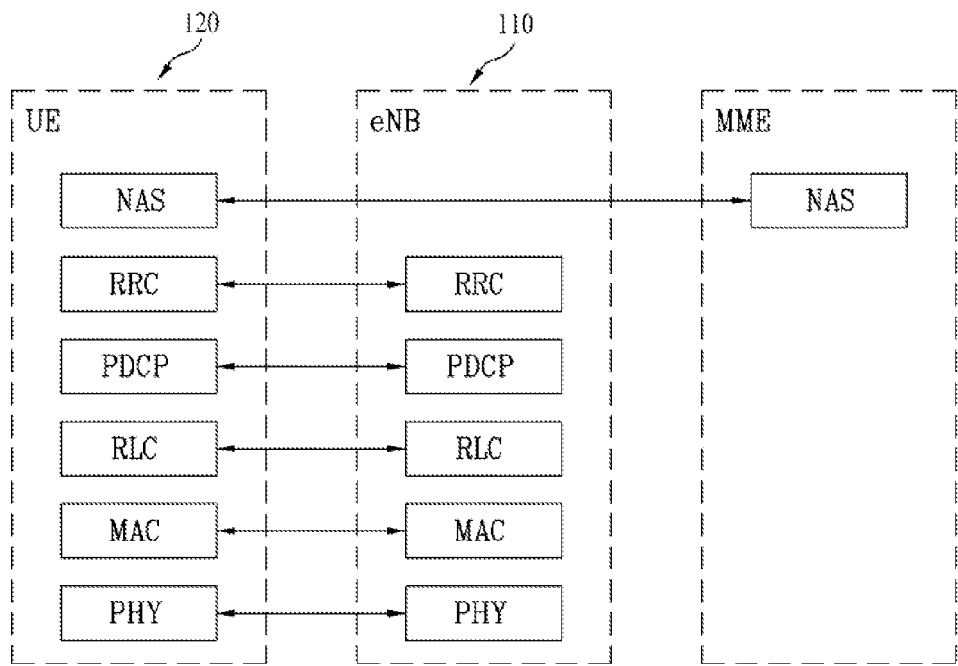
(a) Control-Plane Protocol Stack
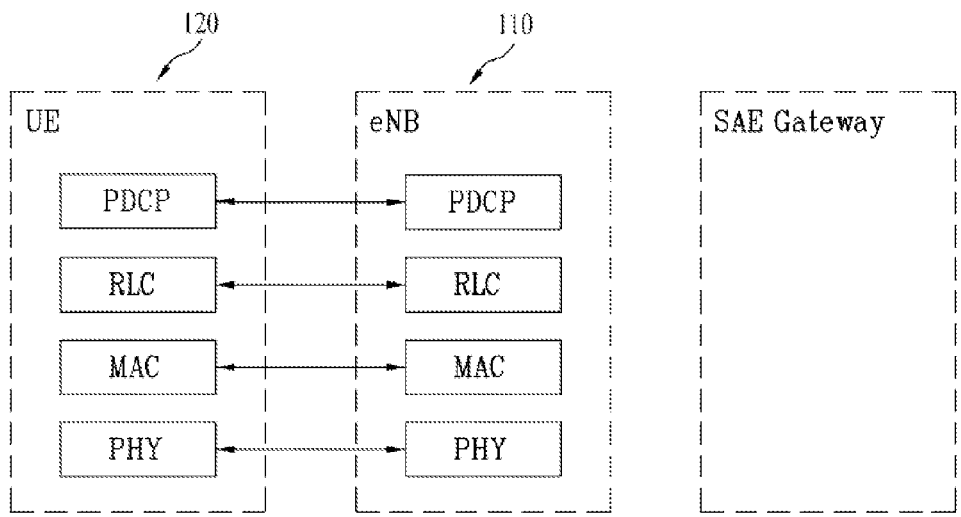
(b) User-Plane Protocol Stack Single Component Carrier (e.g. LTE System)

PUCCH format 1a and 1b structure (Case of normal CP)

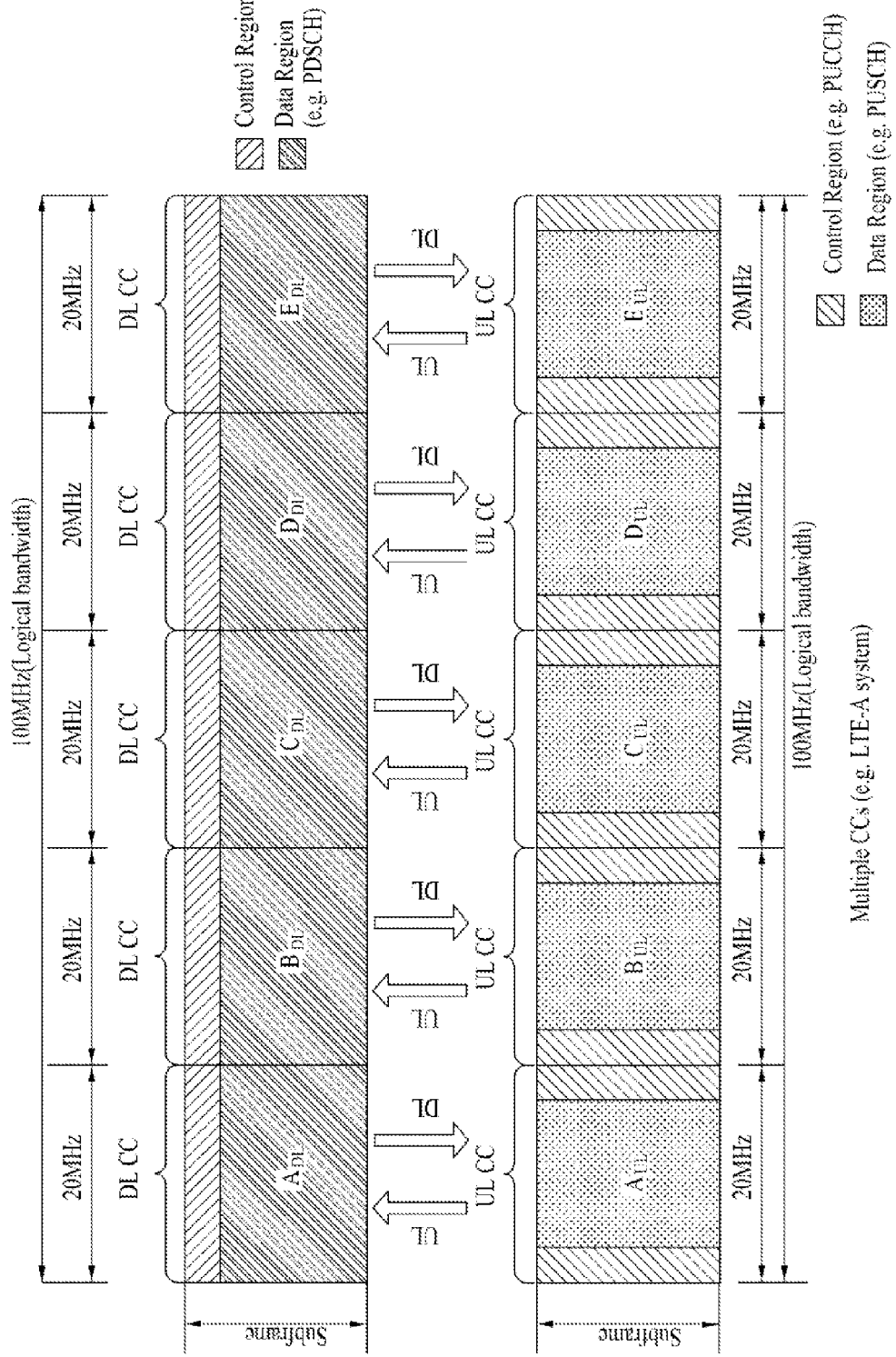

FIG. 9

Example of transmitting a plurality of uplink channels

|  | Single or multiple component carriers |
|---|---|
| Case 1 | Plurality of PUCCHs |
| Case 2 | Plurality of PUSCHs |
| Case 3 | Plurality of SRSs |
| Case 4 | Combination of PUCCH and PUSCH |
| Case 5 | Combination of PUCCH and SRS |
| Case 6 | Combination of SRS and PUSCH |
| Case 7 | Combination of PUCCH, PUSCH and SRS |

METHOD FOR CONTROLLING SIGNAL TRANSMISSION POWER AND DEVICE FOR SAME

CROSS-REFERENCE TO RELATED APPLICATIONS

This application is a continuation of co-pending U.S. patent application Ser. No. 13/143,824 filed on Jul. 8, 2011, which is the National Phase of PCT/KR2010/000510 filed on Jan. 28, 2010, which claims priority under 35 U.S.C. 119(e) to U.S. Provisional Application No. 61/148,368 filed on Jan. 29, 2009, U.S. Provisional Application No. 61/229,280 filed on Jul. 29, 2009, U.S. Provisional Application No. 61/246,489 filed on Sep. 28, 2009, U.S. Provisional Application No. 61/255,868 filed on Oct. 29, 2009, U.S. Provisional Application No. 61/286,380 filed on Dec. 15, 2009, and under 35 U.S.C. 119(a) to Patent Application No. 10-2010-0007528 filed in the Republic of Korea on Jan. 27, 2010. The entire contents of all of the above applications are hereby incorporated by reference.

BACKGROUND OF THE INVENTION

1. Field of the Invention

The present invention relates to a wireless communication system, and more particularly, to a method and device for controlling an uplink transmission power.

2. Discussion of the Related Art

Wireless communication systems have been widely deployed to provide a variety of types of communication services such as voice or data. Generally, wireless communication systems are multiple access systems capable of supporting communication with multiple users by sharing available system resources (bandwidth, transmission power, etc.). Examples of the multiple access system include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) system, and the like.

SUMMARY OF THE INVENTION

An object of the present invention is to provide a method and device for efficiently controlling a transmission power when transmitting a plurality of signals in a wireless communication system.

Another object of the present invention is to provide a method and device for efficiently controlling a transmission power when the sum of transmission powers of signals exceeds a maximum transmission power when transmitting a plurality of signals in a wireless communication system.

Technical problems to be solved by the present invention are not limited to the above-mentioned technical problem, and other technical problems not mentioned above can be clearly understood by one skilled in the art from the following description.

In one aspect of the present invention, a method for transmitting signals in a wireless communication system includes independently determining transmission powers of a first channel and a second channel, reducing at least one of the transmission powers of the first and second channels in consideration of channel priority if the sum of the transmission powers of the first and second channels exceeds a maximum transmission power, and simultaneously transmitting signals to a base station through the first and second channels.

In another aspect of the present invention, a User Equipment (UE) includes a Radio Frequency (RF) unit for transmitting and receiving a radio signal to and from a Base Station (BS), a memory for storing information transmitted and received to and from the BS and parameters necessary for operation of the UE, and a processor connected to the RF unit and the memory and configured to control the RF unit and the memory for operation of the UE, wherein the processor independently determines transmission powers of a first channel and a second channel, reduces at least one of the transmission powers of the first and second channels in consideration of channel priority if the sum of the transmission powers of the first and second channels exceeds a maximum transmission power, and simultaneously transmits signals to a base station through the first and second channels.

Each of the first and second channels may include one or more Single Carrier Frequency Division Multiple Access (SC-FDMA) symbols. Meanwhile, the channel priority may be determined considering at least one of a channel type or channel information. Each of the channels may include any one of a Physical Uplink Shared CHannel (PUSCH), a Physical Uplink Control CHannel (PUCCH), or a Sounding Reference Signal (SRS).

If both the first channel and the second channel are PUSCHs, the channel priority may be determined considering at least one of a transmission format, retransmission/non-retransmission, or the number of retransmissions. If a transmission power of a PUSCH is reduced, a Modulation and Coding Scheme (MCS) applied to the PUSCH may be controlled as a low value in consideration of a reduced power amount. If the first channel is a PUCCH transmitting an ACK and the second channel is a PUSCH, high channel priority may be allocated to the PUSCH.

In a further aspect of the present invention, a method for transmitting signals at a User Equipment (UE) in a wireless communication system includes confirming a maximum transmission power (P_CC_MAX) per component carrier of a plurality of component carriers and a maximum transmission power (P_UE_MAX) of the UE, calculating respective transmission powers for a plurality of channels scheduled to be simultaneously transmitted to a Base Station (BS) through one or more component carriers, independently adjusting the transmission powers for the plurality of channels so as not to exceed the P_CC_MAX and the P_UE_MAX, and transmitting signals to the BS through the plurality of channels for which the transmission powers are adjusted.

In another aspect of the present invention, a User Equipment (UE) includes a Radio Frequency (RF) unit for transmitting and receiving a radio signal to and from a Base Station (BS), a memory for storing information transmitted and received to and from the BS and parameters necessary for operation of the UE, and a processor connected to the RF unit and the memory and configured to control the RF unit and the memory for operation of the UE, wherein the processor confirms a maximum transmission power (P_CC_MAX) per component carrier of a plurality of component carriers and a maximum transmission power (P_UE_MAX) of the UE, calculates respective transmission powers for a plurality of channels scheduled to be simultaneously transmitted to a Base Station (BS) through one or more component carriers; independently adjusts the transmission powers for the plurality of channels so as not to exceed the P_CC_MAX and the P_UE_MAX, and transmits signals to the BS through the plurality of channels for which the transmission powers are adjusted.

Information for setting the P_CC_MAX and information for setting the P_UE_MAX may be signaled through a broadcast message or a Radio Resource Control (RRC) message.

The adjustment of the transmission powers for the plurality of channels may include independently reducing transmission powers of the respective channels so that the sum of the transmission powers of the plurality of channels does not exceed the P_UE_MAX, and, after the reducing transmission powers of the respective channels, independently reducing transmission powers of corresponding channels per component carrier so that the sum of the transmission powers of the corresponding channels does not exceed a corresponding P_CC_MAX. In this case, at least a part of the reduced powers from the corresponding channels may be used to increase transmission powers of other component carriers.

The adjustment of the transmission powers for the plurality of channels may include independently reducing transmission powers of corresponding channels per component carrier so that the sum of the transmission powers of the corresponding channels does not exceed a corresponding P_CC_MAX, and, after the reducing transmission powers of the respective channels, independently reducing transmission powers of the respective channels so that the sum of the transmission powers of the plurality of channels does not exceed the P_UE_MAX.

The adjustment of the transmission powers for the plurality of channels may include independently applying an attenuation coefficient to the respective channel.

Each of the channels may include one or more Single Carrier Frequency Division Multiple Access (SC-FDMA) symbols. In this case, each of the channels may include any one of a Physical Uplink Shared CHannel (PUSCH), a Physical Uplink Control CHannel (PUCCH), or a Sounding Reference Signal (SRS).

In another aspect of the present invention, a method for transmitting signals at a User Equipment (UE) in a wireless communication system includes calculating a transmission power of each of a plurality of antennas, calculating transmission power attenuation ratios if the calculated transmission power exceeds a maximum transmission power of a corresponding antenna, identically applying a maximum attenuation ratio among the transmission power attenuation ratios to the plurality of antennas, and transmitting a signal to a Base Station (BS) through the plurality of antennas.

According to exemplary embodiments of the present invention, a transmission power can be efficiently controlled when transmitting a plurality of signals in a wireless communication system. Furthermore, a transmission power can be efficiently controlled when the sum of transmission powers of signals exceeds a maximum transmission power.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 2 illustrates the structure of a radio interface protocol between a UE and an E-UTRAN based on the 3GPP radio access network standard;

FIG. 7 illustrates an example of performing communication in a multiple component carrier environment;

FIG. 9 illustrates an example of transmitting a plurality of signals according an embodiment of the present invention;

DETAILED DESCRIPTION OF THE INVENTION

The configuration, operation, and other characteristics of the present invention may be understood by the embodiments of the present invention described with reference to the accompanying drawings. Herein, the embodiments of the present invention may be used in various wireless access technologies, such as CDMA, FDMA, TDMA, OFDMA, SC-FDMA, and MC-FDMA. CDMA may be implemented with wireless technology such as Universal Terrestrial Radio Access (UTRA) or CDMA2000. TDMA may be implemented with wireless technology such as Global System for Mobile communications (GSM)/General Packet Radio Service (GPRS)/Enhanced Data Rates for GSM Evolution (EDGE). OFDMA may be implemented with wireless technology such as IEEE 802.11 (Wi-Fi), IEEE 802.16 (WiMAX), IEEE 802.20, and E-UTRA (Evolved UTRA). UTRA is part of a Universal Mobile Telecommunications System (UMTS). 3rd Generation Partnership Project (3GPP) Long Term Evolution (LTE) is a part of an Evolved UMTS (E-UMTS), which uses E-UTRA. LTE-A (Advanced) is an evolved version of 3GPP LTE.

The following embodiments of the present invention mainly describe examples of the technical characteristics of the present invention as applied to the 3GPP system. However, this is merely exemplary. Therefore, the present invention will not be limited to the embodiments of the present invention described herein.

Figure 1:
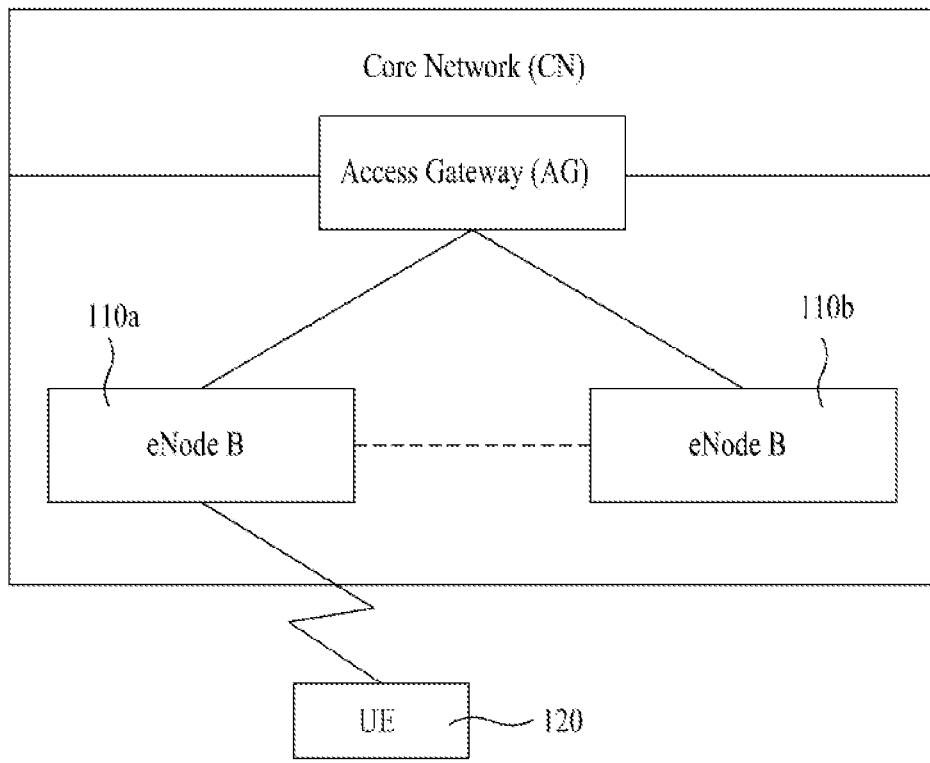
FIG. 1 illustrates a network structure of an Evolved Universal Mobile Telecommunications System (E-UMTS)

FIG. 1 illustrates a network structure of an E-UMTS. The E-UMTS is also called an LTE system. For details of the technical specifications of the UMTS and E-UMTS, refer to Release 7 and Release 8 of "3rd Generation Partnership Project; Technical Specification Group Radio Access Network", respectively.

Referring to FIG. 1, the E-UMTS includes a User Equipment (UE) 120, eNode Bs (or eNBs) 110a and 110b, and an Access Gateway (AG) which is located at an end of a network (E-UTRAN) and is connected to an external network. The eNode Bs may simultaneously transmit multiple data streams for a broadcast service, a multicast service, and/or a unicast service. One or more cells may exist per eNode B. A cell is set to use one of bandwidths of 1.25, 2.5, 5, 10, and 20 MHz.

Different cells may be set to provide different bandwidths. The eNode B controls data transmission and reception for a plurality of UEs. The eNode B transmits downlink (DL) scheduling information with respect to DL data to notify a corresponding UE of a time/frequency domain in which data is to be transmitted, coding, data size, and Hybrid Automatic Repeat and reQuest (HARQ)-related information. In addition, the eNode B transmits uplink (UL) scheduling information with respect to UL data to inform a corresponding UE of an available time/frequency domain, coding, data size, and HARQ-related information. A Core Network (CN) may include the AG, a network node for user registration of the UE, and the like. The AG manages mobility of a UE on a Tracking Area (TA) basis, wherein one TA includes a plurality of cells.

FIG. 2 illustrates the structures of a control plane and a user plane of a radio interface protocol between a UE and an E-UTRAN based on the 3GPP radio access network standard. The control plane refers to a path used for transmitting control messages which are used in the UE and the network to manage a call. The user plane refers to a path used for transmitting data generated in an application layer, e.g., voice data or Internet packet data.

A physical (PHY) layer, which is a first layer, provides an information transfer service to an upper layer using a physical channel. The PHY layer is connected to a Medium Access Control (MAC) layer of an upper layer via a transport channel. Data is transported between the MAC layer and the PHY layer via the transport channel. Data is also transported between a physical layer of a transmitting side and a physical layer of a receiving side via a physical channel. The physical channel uses time and frequency as radio resources. Specifically, the physical channel is modulated using an OFDMA scheme in DL and is modulated using an SC-FDMA scheme in UL.

A MAC layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as IPv4 or IPv6 in a radio interface having a narrow bandwidth.

A Radio Resource Control (RRC) layer located at the bottommost portion of a third layer is defined only in the control plane. The RRC layer controls logical channels, transport channels, and physical channels in relation to configuration, re-configuration, and release of Radio Bearers (RBs). The RB refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

DL transport channels for data transmission from the network to the UE include a Broadcast Channel (BCH) for transmitting system information, a Paging Channel (PCH) for transmitting paging messages, and a DL Shared Channel (DL-SCH) for transmitting user traffic or control messages. Meanwhile, UL transport channels for data transmission from the UE to the network include a Random Access Channel (RACH) for transmitting initial control messages and a UL Shared Channel (UL-SCH) for transmitting user traffic or control messages.

Figure 3:
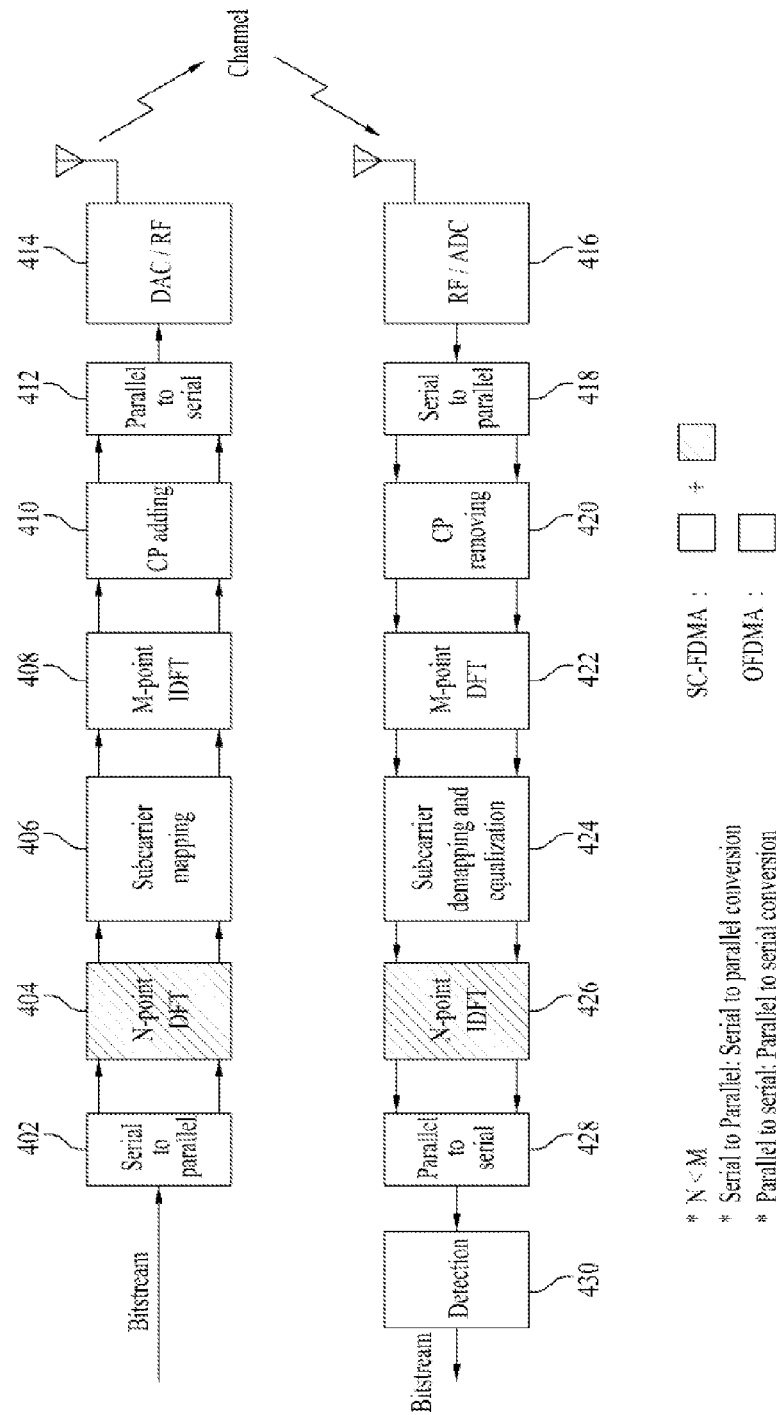
FIG. 3 illustrates a block diagram of a transmitter and a receiver for OFDMA and SC-FDMA.

FIG. 3 illustrates a block diagram of a transmitter and a receiver for OFDMA and SC-FDMA. In UL, a transmitter (402-414) is a part of a UE and a receiver (416-430) is a part of an eNode B. In DL, the transmitter is a part of the eNode B and the receiver is a part of the UE.

Referring to FIG. 3, an OFDMA transmitter includes a serial-to-parallel converter 402, a subcarrier mapping module 406, an M-point Inverse Discrete Fourier Transform (IDFT) module 408, a Cyclic Prefix (CP) adding module 410, a parallel-to-serial converter 412, and a Radio Frequency (RF)/ Digital-to-Analog Converter (DAC) module 414.

Signal processing in the OFDMA transmitter proceeds as follows. First, a bitstream is modulated into a data symbol sequence. The bitstream may be obtained by performing various types of signal processing including channel encoding, interleaving, scrambling, etc. on a data block delivered from a MAC layer. The bitstream is also referred to as a codeword and is equivalent to a data block received from the MAC layer. The data block received from the MAC layer is referred to as a transport block as well. A modulation scheme may include, without being limited to, Binary Phase Shift Keying (BPSK), Quadrature Phase Shift Keying (QPSK), and n-Quadrature Amplitude Modulation (n-QAM). Next, a serial data symbol sequence is converted into N data symbols in parallel (402). The N data symbols are mapped to N subcarriers allocated among a total of M subcarriers and the (M−N) remaining subcarriers are padded with Os (406). The data symbol mapped in a frequency domain is converted to a time-domain sequence through M-point IFFT processing (408). Thereafter, in order to reduce Inter-Symbol Interference (ISI) and Inter-Carrier Interference (ICI), an OFDMA symbol is generated by adding a CP to the time-domain sequence (410). The generated parallel OFDMA symbol is converted into serial OFDMA symbol (412). The OFDMA symbol is then transmitted to a receiver through digital-to-analog conversion, frequency upconversion, and the like (414). Available subcarriers among the (M−N) remaining subcarriers are allocated to another user. Meanwhile, an OFDMA receiver includes an RF/Analog-to-Digital Converter (ADC) module 416, a serial-to-parallel converter 418, a CP removing module 420, an M-point Discrete Fourier Transform (DFT) module 422, a subcarrier demapping/equalization module 424, a parallel-to-serial converter 428, and a detection module 430. A signal processing process of the OFDMA receiver has a configuration reverse to that of the OFDMA transmitter.

Meanwhile, compared to the OFDMA transmitter, an SC-FDMA transmitter further includes an N-point DFT module 404 located before the subcarrier mapping module 406. The SC-FDMA transmitter spreads a plurality of data in a frequency domain through DFT prior to IDFT processing, thereby considerably decreasing a Peak-to-Average Power Ratio (PAPR) of a transmission signal in comparison with an OFDMA scheme. Compared to the OFDMA receiver, an SC-FDMA receiver further includes an N-point IDFT module 426 after the subcarrier demapping module 424. A signal processing process of the SC-FDMA receiver has a configuration reverse to that of the SC-FDMA transmitter.

Figure 4:
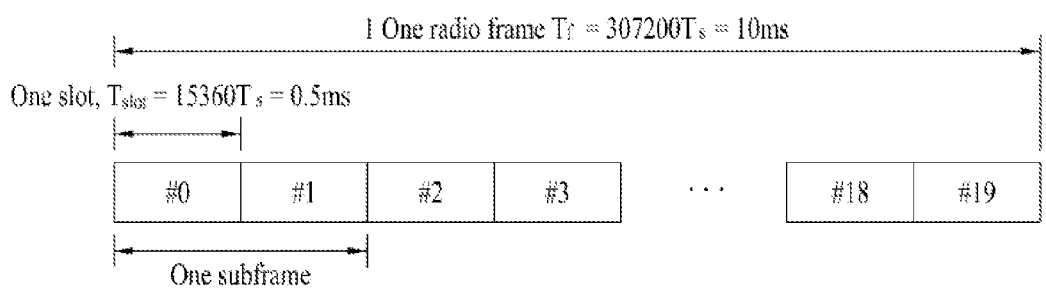
FIG. 4 illustrates the structure of a radio frame used in an LTE system.

FIG. 4 illustrates the structure of a radio frame used in an LTE system.

Referring to FIG. 4, a radio frame has a length of 10 ms (327200 $T_s$) and includes 10 equally sized subframes. Each of the subframes has a length of 1 ms and includes two slots. Each of the slots has a length of 0.5 ms (15360 $T_s$). In this case, $T_s$ denotes a sampling time, and is represented by $T_s=1/$ (15 kHz×2048)=3.2552×10⁻⁸ (about 33 ns). Each slot includes a plurality of OFDM symbols in a time domain and includes a plurality of Resource Blocks (RBs) in a frequency domain. In the LTE system, one RB includes 12 subcarriers×7 (or 6) OFDM symbols. A Transmission Time Interval (TTI) which is a unit time for data transmission may be determined in units of one or more subframes. The above-described radio frame structure is purely exemplary and various modifications may be made in the number of subframes, the number of slots or the number of OFDM symbols, included in the radio frame.

Figure 5:
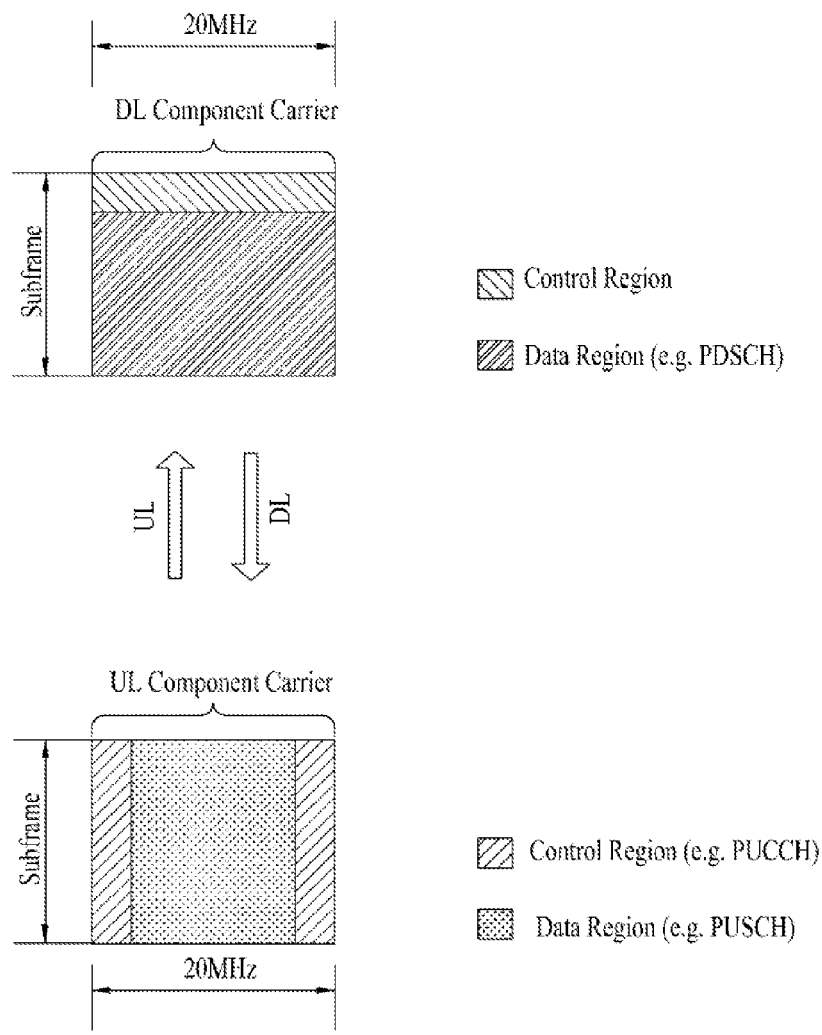
FIG. 5 illustrates an example of performing communication in a single component carrier environment.

FIG. 5 illustrates an example of performing communication in a single component carrier environment. FIG. 5 may correspond to an example of communication in an LTE system.

Referring to FIG. 5, in an FDD scheme, communication is generally performed through one DL band and through one UL band corresponding to the DL band. In a TDD scheme, communication is performed through a DL duration and through a UL duration corresponding to the DL duration. In the FDD or TDD scheme, data and/or control information may be transmitted and received in units of subframes. A UE reduces interference with neighboring cells caused by an excessive transmission power and optimizes the amount of used power through a power control scheme, by raising a power in a bad channel environment and lowering a power in a good channel environment during transmission. In the case where a channel environment is not good, a Base Station (BS) commands that the power of a UE be raised. However, a command indicating that the power of the UE exceeds a maximum transmission power (i.e. transmission power limitation $P^{UE}_{Max}$ or $P_{Max}$) of the UE is disregarded.

Figure 6A:
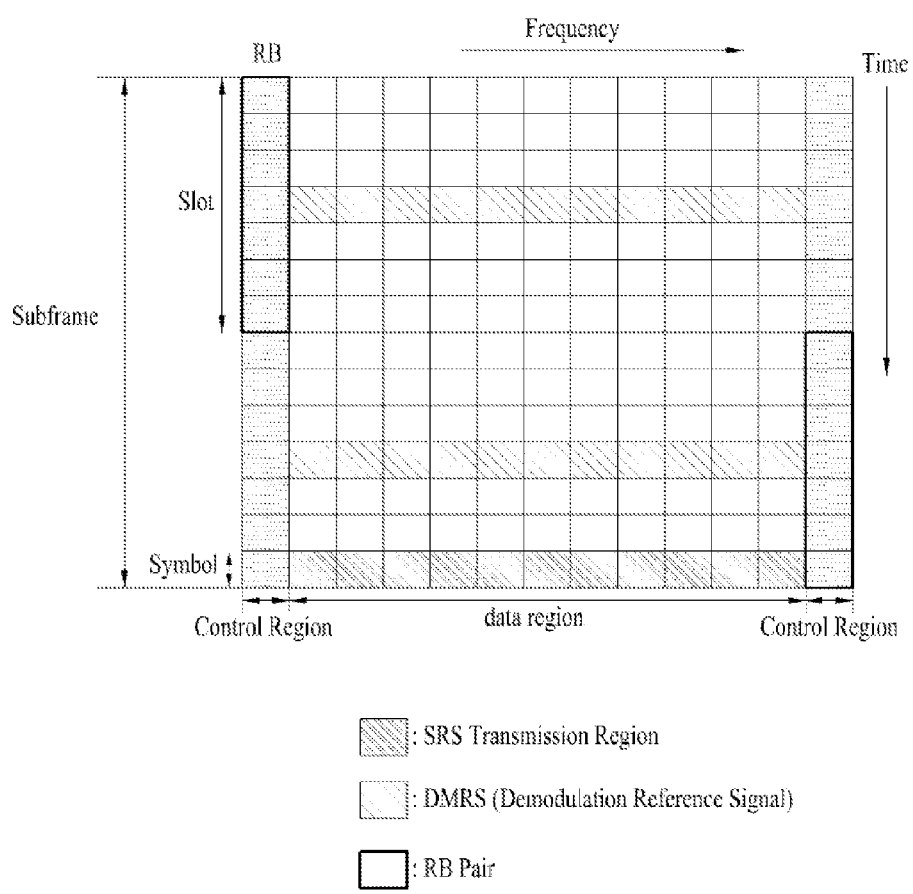
FIG. 6A illustrates the structure of a UL subframe used in an LTE system.

FIG. 6A illustrates the structure of a UL subframe used in an LTE system.

Referring to FIG. 6A, an UL subframe includes a plurality of slots (e.g. two slots). A slot may include a different number of SC-FDMA symbols according to the length of a CP. For example, in a normal CP, a slot includes 7 SC-FDMA symbols. The UL subframe is divided into a data region and a control region. The data region includes a Physical Uplink Shared CHannel (PUSCH) and is used to transmit data signals such as voice and images. The power of a data signal is determined based on the power of a Reference Signal (RS) included in the same region. For example, the power of the data signal may be determined based on the power of a DeModulation Reference Signal (DMRS).

The control region includes a Physical Uplink Control CHannel (PUCCH) and transmits various control information to UL. The PUCCH includes a Resource Block (RB) pair located at both ends of the data region in a frequency domain and hops based on a slot. A transmission power of control information is determined based on a transmission power of a control channel reference signal located in the PUCCH. Details of the structure of the PUCCH will be described later with reference to FIG. 6B. A Sounding Reference Signal (SRS) for UL channel measurement is located in the last SC-FDMA symbol of a subframe and is transmitted through all or some bands of the data region.

UL transmission in the LTE system exhibits single carrier characteristic using SC-FDMA and the PUSCH, PUCCH, and SRS are not permitted to be simultaneously transmitted. SC-FDMA enables a power amplifier to be efficiently used by maintaining a low PAPR compared to a multi-carrier system (e.g. OFDM). Accordingly, if both data and control signals should be simultaneously transmitted, information which should be transmitted through the PUCCH is multiplexed with data in a piggyback manner. Moreover, in an SC-FDMA symbol in which the SRS is transmitted, the PUSCH or the PUCCH is not transmitted. Power control of the PUSCH is independent of power control of the PUCCH.

Figure 6B:
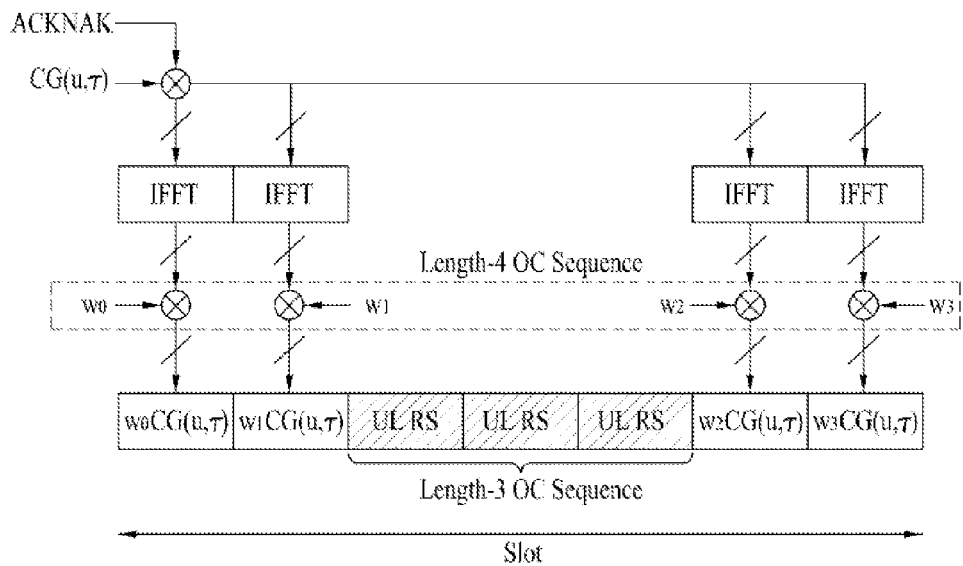
FIG. 6B illustrates the structure of a UL control channel used in an LTE system.

FIG. 6B illustrates the structure of a PUCCH used in an LTE system.

Referring to FIG. 6B, in a normal CP, UL RSs are conveyed in three successive symbols located in the middle of a slot and control information (i.e. ACK/NACK) is conveyed in the four remaining symbols. In an extended CP, a slot includes 6 symbols and RSs are conveyed in the third and fourth symbols. The control information further includes a Channel Quality Indicator (CQI), a Scheduling Request (SR), a Precoding Matrix Index (PMI), a Rank Indicator (RI), and the like. A transmission power of the control information is determined based on a transmission power of a UL RS. In the structure of the PUCCH, the number and position of UL RSs vary according to types of the control information. Resources for the control information are distinguished using different Cyclic Shifts (CSs) (frequency spread) and/or different Walsh/DFT orthogonal codes (time spread) of a Computer Generated Constant Amplitude Zero Auto Correlation (CG-CAZAC) sequence. Even if w0, w1, w2, and w3 multiplied after IFFT are multiplied before the IFFT, the same result is obtained. An Orthogonal Cover (OC) sequence of a corresponding length may be multiplied to the RS.

FIG. 7 illustrates an example of performing communication in a multiple component carrier environment. Recently, a wireless communication system (e.g. an LTE-A system) uses carrier aggregation or bandwidth aggregation technology which uses a wider UL/DL bandwidth by aggregating a plurality of UL/DL frequency blocks in order to employ a wider frequency band. The respective frequency blocks are transmitted using a Component Carrier (CC). In this specification, the CC may refer to a frequency block for carrier aggregation or a center carrier of the frequency block according to contexts and they are mixedly used.

Referring to FIG. 7, five 20 MHz CCs per each of UL/DL may support a bandwidth of 100 MHz. The respective CCs may be adjacent to each other in a frequency domain or may not be adjacent. For convenience, FIG. 7 shows the case where a bandwidth of a UL CC is the same as a bandwidth of a DL CC and they are symmetrical. However, a bandwidth of each CC may be independently determined. For example, a bandwidth of a UL CC may be configured as 5 MHz ($A_{UL}$)+20 MHz ($B_{UL}$)+20 MHz ($C_{UL}$)+20 MHz ($D_{UL}$)+5 MHz ($E_{UL}$). It is also possible to configure asymmetric carrier aggregation in which the number of UL CCs is different from the number of DL CCs. Asymmetric carrier aggregation may be generated due to limitation of available frequency bands or may be intentionally performed during network setup. For example, even if an entire system band is comprised of N CCs, a frequency band which can be received by a specific UE may be limited to M (<N) CCs. Various parameters for carrier aggregation may be set cell-specifically, UE group-specifically, or UE-specifically.

In the LTE-A system, a transmitting end may simultaneously transmit a plurality of signals/(physical) channels through a single CC or multiple CCs. For example, the same or different two or more channels selected from the PUSCH, PUCCH, or SRS may be simultaneously transmitted. Accordingly, if a plurality of (physical) channels is transmitted without maintaining a single carrier transmission characteristic, it is necessary to consider operation of a UE when a sum of transmission powers calculated with respect to the plurality of (physical) channels reaches a maximum transmission power limitation. Unless otherwise mentioned in this specification, a plurality of signals/(physical) channels refers to signals/

(physical) channels, transmission powers of which are independently determined. For example, a plurality of signals/(physical) channels includes signal/(physical) channels associated with different separate RSs. In this specification, transmission of a (physical) channel refers to transmission of a signal through a (physical) channel. In this specification, a signal and a (physical) channel are mixedly used.

Hereinafter, a method of controlling a transmission power will be described in detail with reference to FIGS. 8 to 11. For convenience, although a description of FIGS. 8 to 11 is given in terms of a UE by way of example, it may be easily applied by modification even when a BS transmits a plurality of signals. In the embodiments of the present invention, a transmission power may be expressed as a linear scale or a dB scale. An operation according to the embodiments of the present invention may be carried out in a power domain or an amplitude domain.

Embodiment 1: Power Control Considering (Channel) Priority

Figure 8:
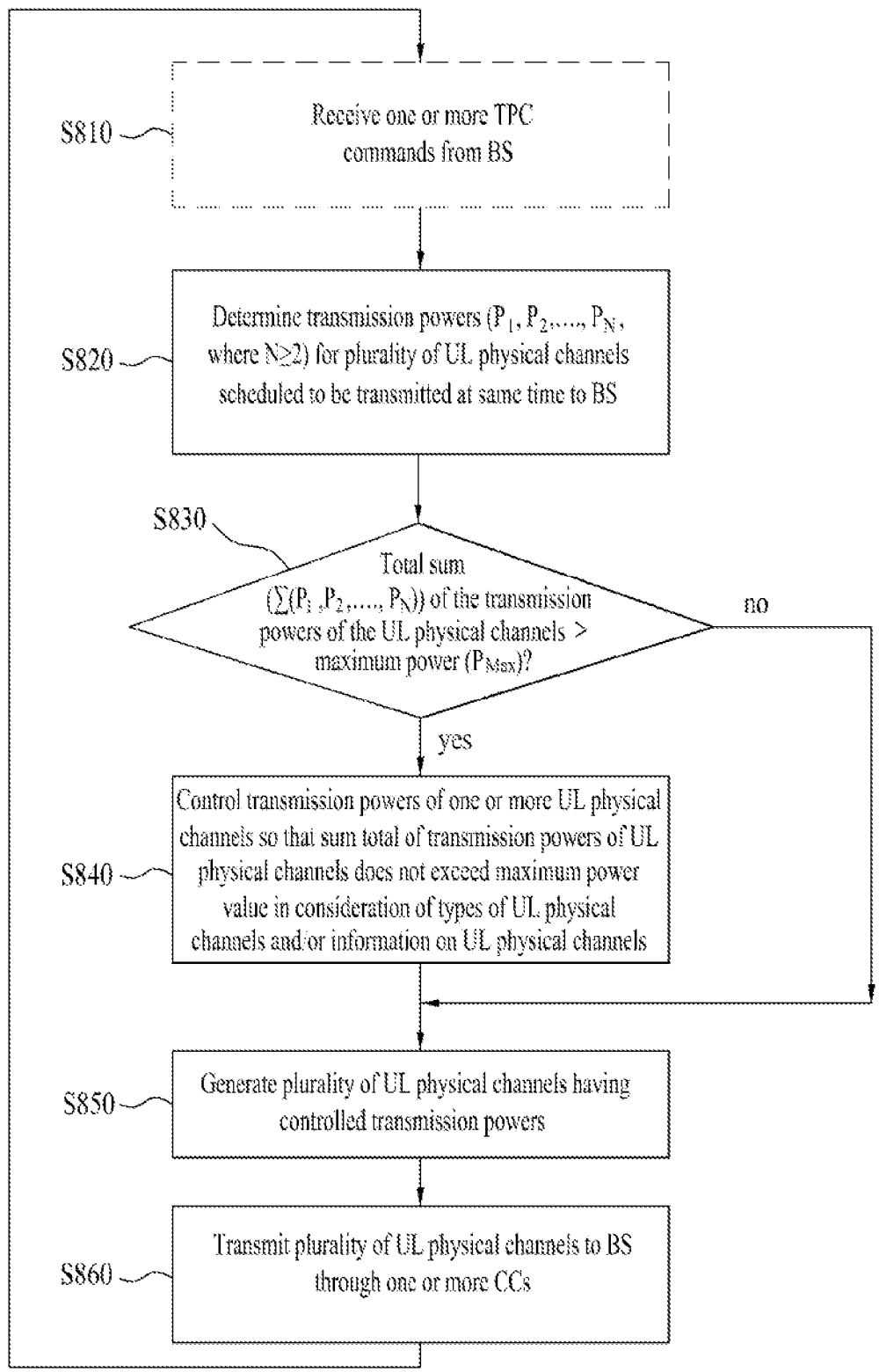
FIG. 8 illustrates exemplary transmission power control according to an embodiment of the present invention.

FIG. 8 illustrates exemplary transmission power control according to an embodiment of the present invention. In this embodiment, it is proposed to control transmission powers of physical channels in consideration of (channel) priority when a sum of transmission powers of a plurality of physical channels exceeds a maximum transmission power.

Referring to FIG. 8, a UE may receive one or more Transmit Power Control (TPC) commands from a BS (S810). The TPC command may be included in a response message to a preamble for random access or may be transmitted through a Physical Downlink Control CHannel (PDCCH). The PDCCH may have various formats according to Downlink Control Information (DCI) and may have different TPC commands according to formats. For example, a UE may receive a PDCCH of various formats, such as a format for DL scheduling, a format for UL scheduling, a TPC dedicated format for a PUSCH, and a TPC dedicated format for a PUCCH. The TPC command may be used to determine a transmission power for each CC, a transmission power for a CC group, or a transmission power for all CCs. The TPC command may also be used to determine a transmission power for each signal (e.g. a PUSCH, a PUCCH, etc.). The TPC command may be received through a PDCCH of various formats, such as a format for DL scheduling, a format for UL scheduling, a TPC dedicated format for a UL data channel (e.g. a PUSCH), and a TPC dedicated format for a UL control channel (e.g. a PUCCH).

If there is a plurality of physical channels scheduled to be simultaneously transmitted to the BS, the UE individually determines transmission powers $P_1, P_2, \ldots, P_N$ (where $N \geq 2$) for a plurality of UL physical channels (S820). Each of the UL physical channels includes one or more successive OFDMA symbols or SC-FDMA symbols. An example of the case where the UE transmits a plurality of signals to UL is illustrated in, but not limited to, FIG. 9. Referring to FIG. 9, a plurality of physical channels may be simultaneously transmitted using a single CC or multiple CCs. For example, a plurality of PUCCHs, a plurality of PUSCHs, or a plurality of SRSs may be simultaneously transmitted (Cases 1 to 3) or combinations of a PUCCH, a PUSCH, and/or an SRS may be simultaneously transmitted (Cases 4 to 7). In the case of the PUCCH, detailed classification into the cases of transmitting an ACK/NACK, a CQI, and an SR is possible.

If the UL transmission powers are determined, the UE checks whether a sum total $\Sigma P_n$ (where $1 \leq n \leq N$) of the transmission powers of the UL physical channels is greater than a maximum power value $P_{Max}$ (S830). The maximum power value may be determined in units of a CC, a CC group, or total CCs. The maximum power value depends basically on physical ability of the UE but may be previously determined according to a communication system. The maximum power value may be changed in consideration of a permissible power within a cell, load balancing, etc. Accordingly, in this specification, the maximum power value may be mixedly used with a maximum permissible power value and the two may be used interchangeably. Information about the maximum power value may be broadcast through a broadcast message (e.g. system information) within a cell or may be signaled through an RRC message. The information about the maximum power value may be transmitted to the UE through a DL control channel (e.g. a PDCCH). The maximum power value may be set permanently, semi-permanently, or dynamically according to channel environments. When the maximum power value is limited by signaling of the BS, it may have the same meaning as the maximum permissible power within a cell. For example, the maximum power value may be previously determined, or may be designated cell-specifically, UE group-specifically, UE-specifically, CC group-specifically, or CC-specifically.

If the sum total $\Sigma P_n$ (where $1 \leq n \leq N$) of the transmission powers of the UL physical channels is equal to or less than the maximum power value $P_{Max}$, transmission powers of corresponding UL physical channels are maintained. Meanwhile, if the sum total of the UL transmission powers of UL physical channels is greater than the maximum power value, transmission powers of one or more UL physical channels are controlled so that the sum total of the transmission powers of the UL physical channels does not exceed the maximum power value in consideration of priority (S840). Priority may be determined considering types of the UL physical channels and information carried on the UL physical channels. Priority will be described in detail later. The transmission powers may be controlled with respect to all bands or in units of CC groups or CCs.

If the transmission powers of the UL physical channels are controlled, the UE generates a plurality of UL physical channels having corresponding transmission powers (S850). The transmission powers of the UL physical channels may be controlled in a frequency domain prior to the IFFT (408 of FIG. 3). However, the present invention is not limited thereto. In this case, control of the transmission powers may be performed in units of subcarriers. For example, the transmission powers may be controlled by multiplying a weight by a modulation value mapped to subcarriers. The weight may be multiplied using a diagonal matrix (a power diagonal matrix) in which each element indicates a value related to a transmission power. In the case of a Multiple Input Multiple Output (MIMO) system, a transmission power may be controlled using a precoding matrix in which a weight is incorporated or may be controlled by multiplying a power diagonal matrix by a precoded modulation value. Accordingly, even if a plurality of physical channels is included within a frequency band to which the same IFFT is applied, a transmission power of each physical channel can be easily controlled. Together with or separately from power control in a frequency domain, transmission powers of UL physical channels may be controlled in a time domain after IFFT. Specifically, the control of transmission powers in a time domain may be performed in various functional blocks. For example, the control of transmission powers may be performed in the DAC block and/or the RF block (414 of FIG. 3). Thereafter, the UE transmits a plurality of generated UL physical channels to the BS through one or more CCs (S860). In this specification, a simultaneous or same time duration includes the same TTI or subframe.

A method for controlling transmission powers of UL channels in consideration of priority in step S840 of FIG. 8 is described in detail. For convenience, an exemplary power control method according to an equal order or priority is described when only two channels are present. However, the present invention is applicable to three or more same or different types of channels or to combinations thereof.

For convenience of description, the following symbols are defined.

$P_{PUSCH}$: this indicates a power calculated to be allocated to a PUSCH. An actually allocated power may be less than $P_{PUSCH}$ by power limitation. If there is no indication of dB, this may mean a linear scale.

$P_{PUCCH}$: this indicates a power calculated to be allocated to a PUCCH. An actually allocated power may be less than $P_{PUCCH}$ by power limitation. If there is no indication of dB, this may mean a linear scale.

$P_{SRS}$: this indicates a power calculated to be allocated to an SRS. An actually allocated power may be less than $P_{SRS}$ by power limitation. If there is no indication of dB, this may mean a linear scale.

Case 1-1: $P_{PUSCH}+P_{PUSCH}>P_{Max}$

Case 1-1 corresponds to the case where a plurality of PUSCHs simultaneously transmitted in a plurality of different CCs reaches a maximum transmission limitation. In this case, it is possible to reduce or drop a transmission power of each PUSCH. Specifically, the following options may be considered.

Option 1: PUSCHs may be given the same priority. If so, it may be possible to reduce powers of the PUSCHs at the same rate or reduce the same amount of the powers of the PUSCHs. That is, the same attenuation rate may be applied or the same value is subtracted.

Option 2: PUSCHs may be given priority in consideration of transport formats of the PUSCHs. For example, priority may be determined according to a Transport Block Size (TBS) or a Modulation and Coding Scheme (MCS) to sequentially reduce or drop a transmission power of a PUSCH having low priority. Desirably, a PUSCH having a small TBS (data amount), a low MCS (a low code rate), or a low modulation order is given low priority. In this case, a higher attenuation rate may be applied to a PUSCH having low priority. However, if a transmission power exceeds the maximum transmission limitation even though only one PUSCH remains due to drop of a PUSCH, a power of a corresponding PUSCH is reduced to $P_{Max}$ during transmission.

Case 1-2: $P_{PUCCH(ACK/NACK)}+P_{PUSCH}>P_{Max}$

Case 1-2 is when the sum of transmission powers of a PUCCH transmitting an ACK/NACK and a PUSCH reaches a maximum power limitation in different CCs or in one CC. The following options may be considered.

Option 1: An ACK/NACK may be given priority. A UL ACK/NACK serves to report success or failure of DL data reception. If such report is not properly made, DL resources are wasted. Accordingly, high priority is allocated to transmission of the ACK/NACK and a transmission power of a PUSCH is reduced or dropped during transmission. In case of reducing the transmission power of the PUSCH, a transmission power may be first allocated to the PUCCH and the remaining power may be allocated to the PUSCH. This can be expressed by the following equation: $P_{PUSCH}=P_{Max}-P_{PUCCH(ACK/NACK)}$. Here, the following option may be additionally applied.

Option 1.1: Since a power remaining after a transmission power is allocated to the PUCCH is used for the PUSCH, an error rate of the PUSCH increases. Therefore, an MCS of data transmitted to the PUSCH is reduced during transmission so that the PUSCH can be received at the same error rate as an error rate before a power reduction. To this end, information about the reduced MCS may be signaled to the BS.

Option 2: The PUSCH may be given priority. If a power of the PUCCH transmitting the ACK/NACK is reduced, DL resources are wasted due to a reception error of the UL ACK/NACK. Especially, if a NACK is recognized as an ACK, retransmission of an upper layer occurs and transmission of DL data is more delayed. Meanwhile, if an ACK is recognized as a NACK, only a waste of retransmission in a physical layer occurs. Accordingly, in the case of transmitting urgent data, it may be considered to first allocate a power to the PUSCH and to allocate the remaining power (decreased power) to the PUCCH, in preparation for the case where data is delayed due to transmission of the PUSCH at a continuous low power. In this case, it is desirable that the power decrease of the PUCCH be limited to the case where the PUCCH transmits the ACK.

Case 1-1: $P_{SRS}+P_{PUSCH}>P_{Max}$

Case 1-3 corresponds to the case where the sum of transmission powers of an SRS and a PUSCH reaches a maximum power limitation in different CCs or one CC. The following options may be considered.

Option 1: SRS transmission may be given priority. An SRS is used when a BS performs optimal UL scheduling by measuring a UL channel state. High priority may be allocated to the SRS in consideration of the efficiency of next scheduling. Then a transmission power of the PUSCH is reduced or dropped during transmission. To reduce the transmission power of the PUSCH, a transmission power may be first allocated to the SRS and the remaining power may be allocated to the PUSCH. This may be expressed as: $P_{PUSCH}=P_{Max}-P_{SRS}$. In this case, the following option may be additionally applied.

Option 1.1: Since a power remaining after a transmission power is allocated to the SRS is used for the PUSCH, an error rate of the PUSCH increases. Therefore, an MCS of data transmitted to the PUSCH is reduced during transmission so that the PUSCH can be received at the same error rate as an error rate before power reduction. To this end, information about the reduced MCS may be signaled to the BS.

Option 2: PUSCH transmission may be given priority. If the transmission power of the SRS is reduced, channel information may be misjudged because a BS is not aware of whether a reduction of a received power is due to a bad environment state of a UL radio channel or due to transmission of a power decreased by a UE. Accordingly, if a transmission power is insufficient, an SRS may be dropped.

Case 1-4: $P_{PUCCH(ACK/NACK)}+P_{PUCCH(ACK/NACK)}>P_{Max}$

Case 1-4 corresponds to the case where the sum of transmission powers of a plurality of PUCCHs transmitting ACKs/NACKs reaches a maximum power limitation. In this case, a transmission power of each PUCCH is reduced or dropped. Specifically, the following options may be considered.

Option 1: PUCCHs transmitting the ACK/NACK may be given the same priority. If so, it may be possible to reduce powers of the PUSCHs at the same rate or reduce the same amount of the powers of the PUSCHs. That is, the same attenuation rate may be applied or the same value is subtracted.

Option 2: Powers of a part of the PUCCHs may be reduced or dropped according to priority.

Option 2.1: If a NACK is recognized as an ACK, resource waste and transmission delay is more severe than in the case where the ACK is recognized as the NACK. Accordingly, a transmission power of a PUCCH transmitting the ACK is first reduced or dropped. It can be considered to set a specific threshold and to reduce the power up to the threshold.

Option 2.2: Priority of the PUCCHs is determined according to a TBS or an MCS of a PDSCH corresponding to an ACK/NACK of each PUCCH and a transmission power of a PUCCH having low priority is reduced or dropped. It is desirable to allocate low priority to a PDSCH of a small TBS or a low MCS. However, in the case of dropping a PUCCH, if a transmission power exceeds the maximum power limitation even though only one PUCCH remains, a power of a corresponding PUCCH is reduced to $P_{max}$ during transmission.

Case 1-5: $P_{PUCCH(CQI)} + P_{PUCCH(CQI)} > P_{Max}$

Case 1-5 corresponds to the case where the sum of transmission powers of a plurality of PUCCHs transmitting CQIs in different CCs reaches a maximum power limitation. A CQI serves to perform efficient DL scheduling by recognizing the state of a DL radio channel. The following options may be considered.

Option 1: PUCCHs transmitting the CQIs may be given the same priority. If so, it may be possible to reduce powers of the PUCCHs at the same rate or reduce the same amount of the powers of the PUCCHs. That is, the same attenuation rate may be applied or the same value is subtracted.

Option 2: Powers of a part of the PUCCHs may be reduced or dropped according to priority. A BS performs scheduling for a UE by selecting a radio channel having a high CQI. Since a channel having a low CQI is less likely to be selected by the BS, accurate reception is less important. Accordingly, a transmission power of a PUCCH having a low CQI is first reduced or dropped during transmission. A specific threshold may be set and reduction of a power up to the threshold may be considered.

Case 1-6: $P_{PUCCH(ACK/NACK)} + P_{PUCCH(CQI)} > P_{Max}$

Case 1-6 is applied when the sum of transmission powers of a plurality of PUCCHs transmitting CQI(s) and ACK/NACK(s) reaches a maximum power limitation. As described earlier, an ACK/NACK is given high priority. Meanwhile, a CQI is used for effective DL scheduling as information transmitting the state of a DL channel to a BS. Even though a better channel is allocated to a UE, unnecessary retransmission occurs if normal reception of data is not accurately confirmed. Therefore, the CQI is given low priority. Namely, a power is first allocated to a PUCCH transmitting the ACK/NACK, and a remaining power is allocated to a PUCCH transmitting the CQI or the PUCCH transmitting the CQI is dropped. Meanwhile, a PUSCH transmitting both the CQI and the ACK/NACK is treated in the same way as the PUCCH transmitting the ACK/NACK.

Case 1-7: $P_{PUCCH(SR)} + P_{PUCCH(ACK/NACK)} > P_{Max}$

Case 1-7 corresponds to the case where the sum of transmission powers of a plurality of PUCCHs transmitting SR(s) and ACK/NACK(s) reaches a maximum power limitation. The following options may be considered.

Option 1: ACK/NACK transmission may be given high priority. Accordingly, a power is first allocated to a PUCCH transmitting an ACK/NACK, and the remaining power is allocated to a PUCCH transmitting an SR or the PUCCH transmitting the SR is dropped. Meanwhile, if the PUCCH transmitting the SR is dropped due to the continuous existence of the PUCCH transmitting the ACK/NACK for a long time, UL scheduling is not possible. To compensate for this, if the PUCCH transmitting the SR is delayed for a specific time, the PUCCH transmitting the ACK/NACK may be dropped.

Option 2: SR transmission may be given high priority. Since an error in ACK/NACK transmission is solved by retransmission, high priority may be allocated to SR transmission by considering scheduling important and a transmission power of the PUCCH transmitting the ACK/NACK may be reduced or dropped during transmission. In the case of reducing the transmission power of the PUCCH transmitting the ACK/NACK, a transmission power may be first allocated to the PUCCH transmitting the SR and the remaining power may be allocated to the PUCCH transmitting the ACK/NACK. This can be expressed as: $P_{PUCCH(ACK/NACK)} = P_{Max} - P_{SR}$.

Option 3: A UE transmits the ACK/NACK to the PUCCH transmitting the SR. Then, a BS may detect an on/off keyed SR in the PUCCH through energy detection and may judge the ACK/NACK through symbol decoding. In this case, if a plurality of PUCCHs transmitting the ACK/NACKs is present, ACK/NACK bundling or PUCCH selection transmission may be used. The ACK/NACK bundling indicates that one ACK is transmitted when all ACKs should be transmitted by receiving a plurality of DL PDSCHs without any error and one NACK is transmitted when there is an error even in any one of the DL PDSCHs. The PUCCH selection transmission represents a plurality of ACK/NACK results by transmitting a modulation value through one PUCCH resource selected from a plurality of occupied PUCCH resources upon receiving a plurality of DL PDSCHs.

Case 1-8: $P_{PUSCH(UCI)} + P_{PUSCH} > P_{Max}$

Case 1-8 corresponds to the case where the sum of transmission powers of a PUSCH transmitting Uplink Control Information (UCI) and a PUCCH transmitting data alone in different CCs reaches a maximum power limitation. The following options may be considered.

Option 1: The priority determination method described in Case 1-1 is used without considering the UCI. For example, PUSCHs may be given the same priority. In this case, powers of the PUSCHs may be reduced at the same rate. In consideration of transport formats of the PUSCHs, different priority may be allocated to the PUSCHs.

Option 2: Since control information is included in a PUSCH on which the UCI is piggybacked, high priority may be allocated to a channel on which the UCI is piggybacked. Accordingly, a transmission power of a PUSCH transmitting data alone is reduced or dropped during transmission. In the case of reducing the transmission power of the PUSCH transmitting the data alone, a transmission power is first allocated to the PUSCH on which the UCI is piggybacked and then the remaining power may be allocated to the PUSCH transmitting the data alone. This may be expressed as: $P_{PUSCH} = P_{Max} - P_{PUCCH(UCI)}$. In the case of reducing the transmission power of the PUSCH transmitting the data alone, a higher attenuation rate may be applied to the PUSCH transmitting the data alone. However, if the transmission power exceeds the maximum transmission power even though only one PUSCH remains due to drop of a PUCCH, a power of a corresponding PUSCH is reduced to $P_{Max}$ during transmission.

Case 1-9: $P_{PUSCH(Retransmission)} + P_{PUSCH} > P_{Max}$

Case 1-9 corresponds to the case where the sum of transmission powers of a PUSCH transmitting retransmission data and a PUSCH transmitting new data reaches a maximum power limitation.

Option 1: The priority determination method described in Case 1-1 is used without considering retransmission. For example, PUSCHs may be given the same priority. In this case, powers of the PUSCHs may be reduced at the same rate. In consideration of transport formats of the PUSCHs, different priority may be allocated to the PUSCHs.

Option 2: Since retransmission may occur due to reduction of a transmission power during previous transmission, high priority may be allocated to a retransmitted PUSCH to improve a reception rate of the PUSCH.

Case 1-10: $P_{PUSCH(Retransmission)} + P_{PUSCH(Retransmission)} > P_{Max}$ Case 1-10 corresponds to the case where the sum of transmission powers of PUSCHs transmitting retransmission data reaches a maximum power limitation. The following options may be considered.

Option 1: The priority determination method described in Case 1-1 may be used without considering retransmission. For example, PUSCHs may be given the same priority. In this case, powers of the PUSCHs may be reduced at the same rate. Different priority may be allocated to the PUSCHs in consideration of transport formats of the PUSCHs.

Option 2: Since retransmission may occur due to reduction of a transmission power during previous transmission, high priority may be allocated to a PUSCH having a greater number of retransmissions to improve a reception rate of a retransmitted PUSCH.

Case 1-11: $P_{PUSCH(Retransmission)} + P_{PUCCH}/P_{SRS} > P_{Max}$

Case 1-11 corresponds to the case where the sum of transmission powers of a PUSCH transmitting retransmission data and a PUCCH/SRS reaches a maximum power limitation. The following operations may be considered.

Option 1: The priority determination methods described in Case 1-2 and Case 1-3 may be used without considering retransmission.

Option 2: Since retransmission may occur due to reduction of a transmission power during previous transmission, high priority may be allocated to a retransmitted PUSCH to improve a reception rate of the PUSCH.

Embodiment 2: Power Control Per CC(Group)

The transmission power control methods of the UE described up to now are useful when the UE has one power amplifier. However, in an LTE-A system, a plurality of CCs may be allocated to the UE and the allocated CCs may be successive or separate bands in a frequency domain. If the allocated CCs exist as separate bands, since it is difficult for the UE to amplify a power in a wide frequency domain using only one power amplifier, a plurality of power amplifiers may be needed. In this case, each power amplifier may be in charge of power amplification of only one CC or only a CC group comprised of some CCs. Accordingly, even if the UE has a plurality of power amplifiers, power control may be naturally applied by extending the above proposed methods to power control methods per CC or CC group.

Hereinafter, operation of a UE according to an exemplary embodiment of the present invention will be described, when the UE reaches a transmission power limitation of a specific CC (group), the UE reaches a total transmission power limitation, or the UE reaches the above two power limitations, in an environment where both the transmission power limitation per CC (group) and the total transmission power limitation of the UE are present.

Generally, a UL transmission power of a UE may be limited as indicated by the following Equation 1:

$$P^{UE} \leq \min\left(P_{Max}^{UE}, \sum_{CC} \min\left(P_{Max}^{CC=i}, \sum_{Ch} P_{Ch=j}^{CC=i}\right)\right)$$ [Equation 1]

If a quantization level of a power amplifier of the UE is sufficiently high, an equality may be satisfied as indicated by Equation 2:

$$P^{UE} = \min\left(P_{Max}^{UE}, \sum_{CC} \min\left(P_{Max}^{CC=i}, \sum_{Ch} P_{Ch=j}^{CC=i}\right)\right)$$ [Equation 2]

Symbols used in the above equation are defined as follows.

$P^{UE}$: UL transmission power of a UE $P_{Max}^{UE}$ ($P_{Max}$): A maximum transmission power (or transmission power limitation value) of a UE. In other words, this indicates a maximum transmission power (or transmission power limitation value) with respect to all CCs. The maximum transmission power value of the UE may be determined by a total transmittable power of the UE or may be determined by combination with a value set in a network (e.g. a BS). Information about the maximum transmission power value of the UE may be indicated through upper layer signaling. For example, the information about the maximum transmission power value of the UE may be cell-specifically signaled through a broadcast message or may be UE-specifically or UE group-specifically signaled through an RRC message.

$P_{Max}^{CC=i}$: A maximum transmission power (or transmission power limitation value) in an i-th CC (group). The maximum transmission power value per CC (group) may be determined by a total transmittable power of the UE or a transmittable power per CC (group) or may be determined by combination with a value set per CC (group) in a network (e.g. a BS). Information about the maximum transmission power value per CC (group) may be indicated through upper layer signaling. For example, the information about the maximum transmission power value per CC (group) may be cell-specifically signaled through a broadcast message or may be UE-specifically or UE group-specifically signaled through an RRC message. Meanwhile, the maximum transmission power value per CC (group) may be signaled in consideration of information about interference (or coverage) with another UE (or CC (group)). Information about the maximum transmission power value per CC (group) may include information about interference (or coverage) with another UE (or CC (group)). The maximum transmission power per CC (group) may have the same value in all CCs (CC groups).

$P_{Ch=j}^{CC=i}$: A transmission power of a j-th channel of an i-th CC (group).

$$\sum_{CC} \min\left(P_{Max}^{CC=i}, \sum_{Ch} P_{Ch=j}^{CC=i}\right) \leq P_{Max}^{UE}$$

Case 2-1 is when the sum of maximum transmission powers of CCs (CC groups) in all CCs (CC groups) is less than a maximum transmission power of a UE and simultaneously the sum of maximum transmission powers of channels of all CCs (CC groups) is less than the maximum transmission power of the UE. Since a transmission power of the UE is not limited to a total transmission power value, a simplified Equation 3 may be satisfied:

$$P^{UE} \leq \sum_{CC} \min\left(P_{Max}^{CC=i}, \sum_{Ch} P_{Ch=j}^{CC=i}\right) =$$ [Equation 3]

$$\sum_{CC \in S} P_{Max}^{CC=i} + \sum_{CC \in S^c} \sum_{Ch} P_{Ch=j}^{CC=i}$$

If a quantization level of a power amplifier of the UE is sufficiently high, an equality may be satisfied as indicated by Equation 4:

$$P^{UE} = \sum_{CC} \min\left(P^{CC=i}_{Max}, \sum_{Ch} P^{CC=i}_{Ch=j}\right) = \sum_{CC \in S} P^{CC=i}_{Max} + \sum_{CC \in S^c} \sum_{Ch} P^{CC=i}_{Ch=j}$$ [Equation 4]

In Equation 3 and Equation 4, a set S refers to a set of a CC (group) in which the sum of transmission powers of channels within a CC (group) exceeds a maximum transmission power value of a CC (group)

$$\left(\text{i.e. } P^{CC=i}_{Max} \le \sum_{Ch} P^{CC=i}_{Ch=j}\right).$$

In this case, the sum of the transmission powers is controlled not to exceed the maximum transmission power of the CC (group) only within the set S. Power control may be performed by introducing an attenuation coefficient. For example, power control may be simplified as a method for searching for an attenuation coefficient $\alpha_j^i (0 \le \alpha_j^i \le 1)$ for a transmission power of each channel as indicated by Equation 5:

$$\sum_{Ch} \alpha_j^i \times P^{CC=i}_{Ch=j} \le P^{CC=i}_{Max}, \text{ where } i \in S$$ [Equation 5]

Case 2-2

$$\sum_{CC} \min\left(P^{CC=i}_{Max}, \sum_{Ch} P^{CC=i}_{Ch=j}\right) > P^{UE}_{Max}$$

Case 2-2 corresponds to the case where a maximum transmission power of a UE is less than the sum of maximum transmission powers of a CC (group) and simultaneously less than the sum of transmission powers of all channels. Since a transmission power of the UE is limited by the maximum transmission power value, Equation 6 is satisfied:

$$P^{UE} \le P^{UE}_{Max}$$ [Equation 6]

If a quantization level of a power amplifier of the UE is sufficiently high, an equality may be satisfied as indicated by Equation 7:

$$P^{UE} = P^{UE}_{Max}$$ [Equation 7]

In this case, the transmission power of the UE can be reduced to the maximum transmission power of the UE as in Case 2-1. The sum of transmission powers of channels within each CC (group) should be less than a maximum transmission power of the CC (group) and the sum of transmission powers of all CCs (CC groups) should be less than the maximum transmission power value of the UE. Power control may be simplified as a method for searching for an attenuation coefficient $\alpha_j^i (0 \le \alpha_j^i \le 1)$ for a transmission power of each channel as indicated by Equation 8:

$$\sum_{Ch} \alpha_j^i \times P^{CC=i}_{Ch=j} \le P^{CC=i}_{Max}, \text{ where } i \in S$$ [Equation 8]

$$\sum_{CC} \sum_{Ch} \alpha_j^i \times P^{CC=i}_{Ch=j} \le P^{UE}_{Max}$$

Since the methods described in Cases 2-1 and 2-2 calculate an attenuation coefficient through optimization for the two cases of limitation (total transmission power limitation and CC (group) transmission power limitation), problems of performing optimization using a somewhat complex method may occur. Accordingly, methods for efficiently calculating the attenuation efficient are described with reference to FIGS. 10 and 11.

Figure 10:
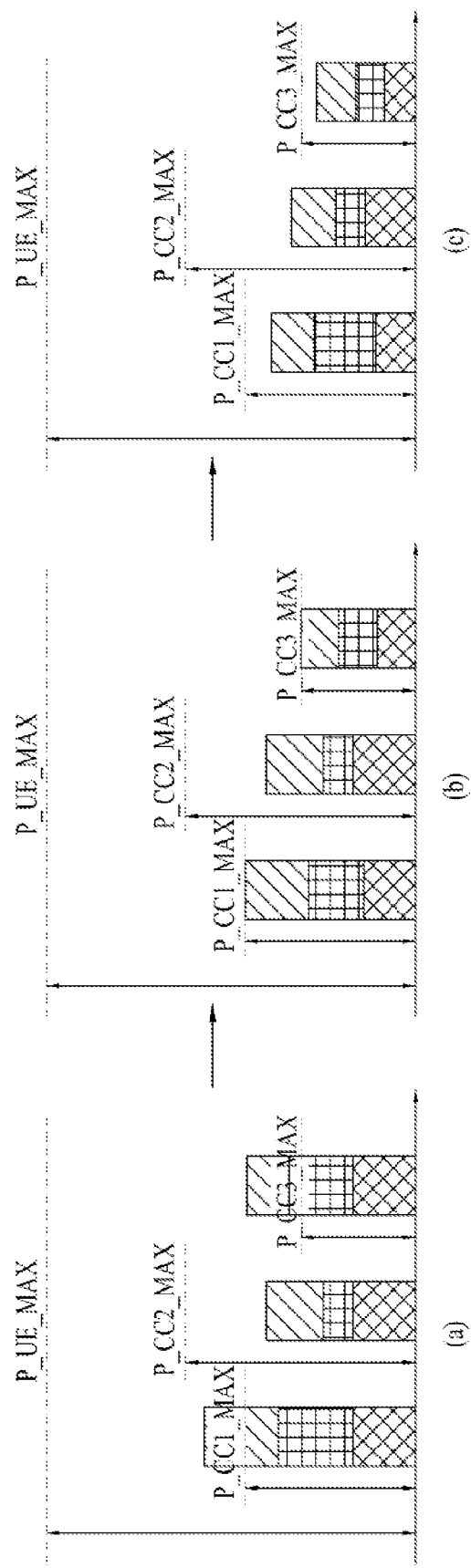
FIG. 10 illustrates an example of controlling a transmission power according to an embodiment of the present invention when a maximum transmission power is limited in units of one or more component carriers.
Figure 11:
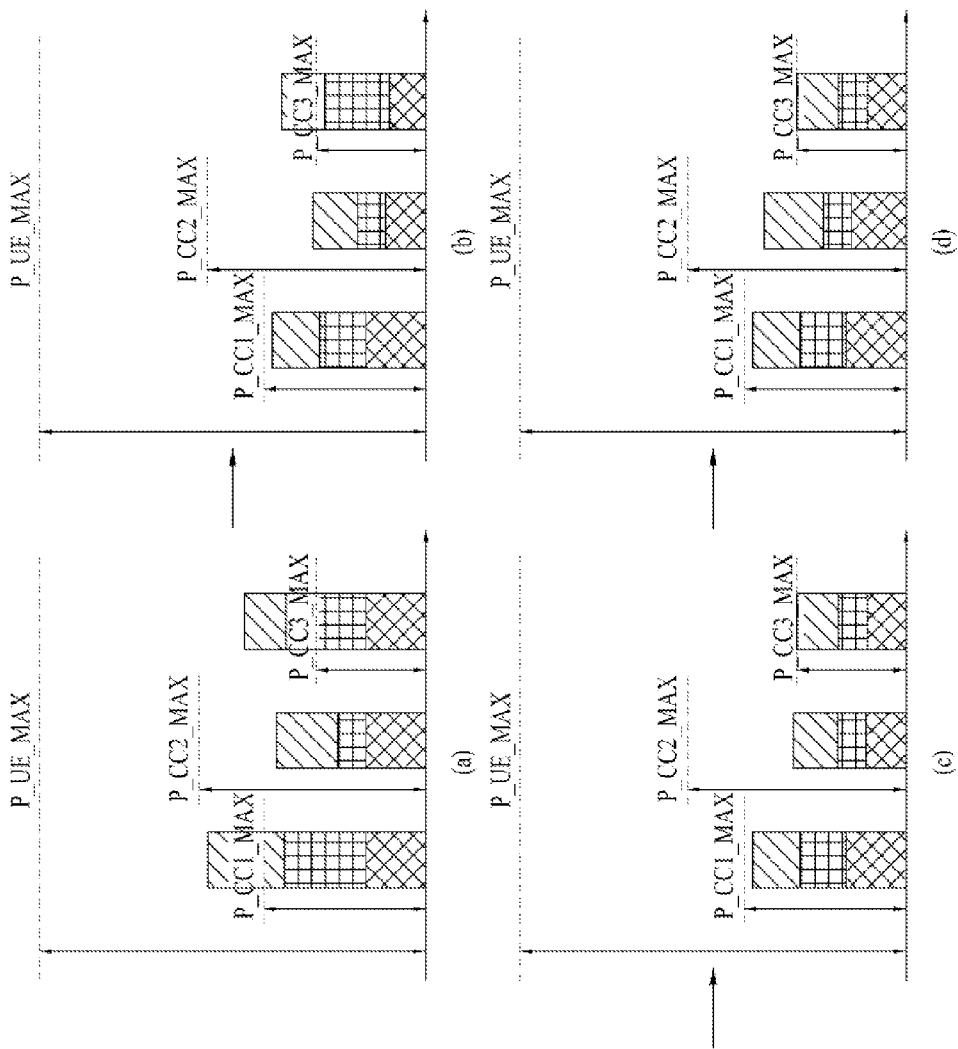
FIG. 11 illustrates another example of controlling a transmission power according to an embodiment of the present invention when a maximum transmission power is limited in units of one or more component carriers.

In FIGS. 10 and 11, the horizontal axis denotes a CC (group) and the vertical axis denotes power strength. A hatching box in each CC (group) indicates a channel within a corresponding CC (group). Hatching is shown for convenience to denote a channel. Respective hatchings may mean different channels or the same channel. In FIGS. 10 and 11, it is assumed that the sum of transmission powers of CCs (CC groups) is greater than a maximum transmission power value P_UE_MAX of a UE and the sums of transmission powers of channels within CCs (CC groups) 1 and 3 exceed maximum transmission powers P_CC1_MAX and P_CC3_MAX of the CCs (CC groups), respectively ((a) of FIG. 10 and (a) of FIG. 11). The CCs (CC groups) 1 and 3 constitute the set S described with reference to Equation 3 and Equation 4.

FIG. 10 illustrates a method for calculating an attenuation coefficient for power control according to an embodiment of the present invention. Referring to FIG. 10, an attenuation coefficient for power control is calculated in two steps. In the first step, transmission powers of channels in a set S may be attenuated to satisfy a transmission power limitation criterion of a CC (group). In the first step, an attenuation coefficient $\alpha_j^i$ may be independently determined according to Equation 9:

$$\alpha_j^i \text{ s.t } \sum_{Ch} \alpha_j^i \times P^{CC=i}_{Ch=j} \le P^{CC=i}_{Max}, \text{ where } i \in S$$ [Equation 9]

It can be seen from (b) of FIG. 10 that the sums of transmission powers of channels within CCs (CC groups) 1 and 3 are reduced to maximum transmission power values of the corresponding CCs (CC groups), respectively.

However, in (b) of FIG. 10, the sum of transmission powers of CCs (CC groups) is still greater than the maximum transmission power value P_UE_MAX of the UE. Thus, if a total transmission power limitation of the UE is not satisfied even though the transmission powers of channels within the set S are reduced, transmission powers of all channels of all CCs (CC groups) are reduced to satisfy the total transmission power limitation in the second step. In the second step, an attenuation coefficient $\beta_j^i$ may be independently determined according to Equation 10:

$$\beta_j^i \text{ s.t } \sum_{CC \in S} \sum_{Ch} \beta_j^i \times \alpha_j^i \times P^{CC=i}_{Ch=j} + \sum_{CC \in S^c} \sum_{Ch} \beta_j^i \times P^{CC=i}_{Ch=j} \le P^{UE}_{Max}$$ [Equation 10]

It can be seen from (c) of FIG. 10 that the sum of transmission powers of all channels is reduced to the total transmission power limitation value P_UE_MAX of the UE. For brevity, the attenuation coefficient $\beta_j^i$ of a channel in the set S may be set to 1 and $\beta_j^i$ may be determined only with respect to a complementary set of the set S. Alternatively, the attenuation coefficient $\beta_j^i$ of a channel in the complementary set of the set S may be set to 1 and $\beta_j^i$ may be determined only with respect to the set S.

FIG. 11 illustrates a method for calculating an attenuation coefficient for power control according to another embodiment of the present invention. Referring to FIG. 11, an attenuation coefficient for power control is basically calculated in two steps and an addition step may be further included for power compensation. In the first step, transmission powers of channels in all CCs (CC groups) may be attenuated to satisfy a total transmission power limitation criterion of a UE. An attenuation coefficient $\beta_j^i$ may be independently determined according to Equation 11:

$$\beta_j^i \text{ s.t } \sum_{CC}\sum_{Ch} \beta_j^i \times P_{Ch=j}^{CC=i} \leq P_{Max}^{UE} \qquad \text{[Equation 11]}$$

It can be seen from (b) of FIG. 11 that transmission powers of channels in all CCs (CC groups) are reduced so that the sum of transmission powers of all channels coincides with a total transmission power limitation value P_UE_MAX of a UE.

However, in (b) of FIG. 11, the sum of transmission powers of channels of a CC (group) 3 is still greater than a power limitation value P_CC3_MAX of the CC (group) 3. Thus, if there is a CC (group) (i.e. a set S) which does not satisfy a transmission power limitation of a CC (group) even though the transmission powers of channels in all CCs (CC groups) are reduced, transmission powers of channels of all CCs (CC groups) within the set S may be reduced in the second step. An attenuation coefficient $\alpha_j^i$ may be independently determined according to a condition of Equation 12:

$$\alpha_j^i \text{ s.t } \sum_{Ch} \alpha_j^i \times \beta_j^i \times P_{Ch=j}^{CC=i} \leq P_{Max}^{CC=i}, \text{ where } i \in S \qquad \text{[Equation 12]}$$

It can be seen from (c) of FIG. 11 that the sum of transmission powers of channels of the CC (group) 3 (i.e. set S) is reduced to the maximum transmission power value P_CC3_MAX of the corresponding CC (group).

Next, in the third step, a power amount $$P_{R-SUM} = \sum_{CC \in S}\sum_{Ch}(1-\alpha_j^i) \times \beta_j^i \times P_{Ch=j}^{CC=i}$$

reduced from channels of the set S may be compensated for channels in a complementary set of the set S. A power after compensation of channels should not exceed a maximum transmission power value of a corresponding CC (group). Referring to (d) of FIG. 11, a power reduced from the CC (group) 3 in the second step is compensated for a CC (group) 2. As opposed to (d) of FIG. 11, the power reduced from the CC (group) 3 in the second step may be compensated for a CC (group) 1. The following is considered as a power compensation method.

① Priority criterion: Priority is allocated according to a degree of urgency or importance of a message in channels (PUCCH, PUSCH, and SRS) and a more power is allocated to a channel having higher priority.

② Same compensation amount: Powers of the same amount are compensated for all channels of a complementary set of a set S.

③ Same compensation rate: Powers are compensated for all channels of the complementary set of the set S at the same rate.

④ Powers are compensated using possible combinations of ①, ② and ③.

The attenuation coefficients $\alpha_j^i$, and $\beta_j^i$ described with reference to FIGS. 10 and 11 may be determined in various ways. A criterion for determining the attenuation coefficients $\alpha_j^i$, and $\beta_j^i$ may consider, but without being limited to, priority, the same attenuation amount, the same attenuation rate, or combinations thereof.

In the priority criterion method, priority is allocated to respective channels according to a degree of urgency or importance of a message in channels (e.g. PUCCH, PUSCH, and SRS) and a greater attenuation coefficient value is allocated to a channel having higher priority. That is, this method ensures that a reception rate is increased for a channel having high priority and a statistically low reception rate is provided to a channel having low priority. Accordingly, a power is reduced beginning from a channel having low priority. Priority of channels may be determined according to the above-described Cases 1-1 to 1-11 and priority between CCs may be additionally considered. For example, if a UE attempts UL transmission using multiple CCs, important control information or an important message among UL transmission messages may be transmitted to a specific CC first. In this case, high priority may be allocated to the specific CC to which the important control information is transmitted.

The priority criterion method may be modified to a simpler method by restricting the attenuation coefficient to 0 or 1 ($\alpha_j^i, \beta_j^i \in \{0,1\}$). Namely, a transmission power of 0 may be sequentially allocated beginning from a channel having low priority within a CC (group) so that the sum of transmission powers of channels is less than a transmission power limitation value $P_{Max}^{CC=i}$ of a CC (group). Consequently, a channel having low priority is not transmitted and a channel having high priority is transmitted at an original transmission power.

The same attenuation amount criterion method serves to reduce the same amount of powers of all channels within each CC (group) which exceeds a transmission power limitation of a CC (group). That is, all channels within a CC (group) are subject to the same power attenuation penalty. This method may be useful when a difference between the sum of transmission powers of channels within a CC (group) and a maximum transmission power value of the CC (group) is insignificant. The same attenuation rate criterion method may apply the same attenuation coefficient to all channels within each CC (group) which exceeds a transmission power limitation of the CC (group). The same attenuation amount criterion method corresponds to a method for reducing the same amount of power in a linear scale, whereas the same attenuation rate criterion method corresponds to a method for reducing the same amount of power in a dB scale.

Embodiment 3: Power Control Per Antenna in MIMO

The above-described power control methods may be applied in the same ways even in transmission through transmit (Tx) diversity or spatial multiplexing using MIMO. In this case, the above-described methods correspond to operation in layers, streams, or antennas. If a UE includes a plurality of transmission antennas, a maximum transmission power in a power amplifier of each antenna may be limited to $P_{max}^{artenna,n}$ (where n is an antenna index). A maximum transmission power of each antenna may be limited by a characteristic (e.g. class) of a power amplifier or may be (additionally) limited through broadcast or RRC signaling. An upper limit of a transmission power which can be used by the UE is limited by a minimum value of the sum of maximum transmission powers of antennas and a maximum transmission power of a UE as indicated by Equation 13:

$$P^{UE} = \min\left(P_{Max}^{UE}, \sum_n P_{Max}^{antenna,n}\right) \quad \text{[Equation 13]}$$

If a transmission power per CC (group) is limited, the upper limit of a transmission power which can be used by the UE may be expressed by Equation 14:

$$P^{UE} = \sum_n \min\left(P_{Max}^{antenna,n}, \sum_{CC \text{ in Antenna } n} \min\left(P_{Max}^{CC=i}, \sum_{Ch} P_{Ch=j}^{CC=i}\right)\right) \quad \text{[Equation 14]}$$

Hereinafter, operation of a UE is proposed when power control is independently performed with respect to each antenna. For convenience, only two antennas are described by way of example but it is possible to apply the present invention to three or more antennas. The following symbols are defined.

$P_{X-CH}^{artenna,n}$: A power calculated to be allocated to an n-th antenna. An actually allocated power may be less than this power by a power limitation. When there is no dB sign, this may mean a linear scale. X-CH denotes all physical channels (e.g. PUSCH, PUCCH, SRS, or combinations thereof) transmitted to an antenna n.

If $P_{X-CH}^{artenna,n} > P_{Max}^{artenna,n}$, $P_{X-CH}^{artenna,m} \leq P_{Max}^{artenna,m}$, one antenna reaches a maximum power limitation and the other antenna does not reach the maximum power limitation. In this case, power control may be performed per antenna as follows:

Step 1: A transmission power for each CC (group) may be controlled as in Embodiment 2 according to a maximum transmission power limitation $P_{Max}^{CC=i}$ per CC (group). Namely, if the sum of the transmission powers of channels of all antennas per CC (group) exceeds $P_{Max}^{CC=i}$, a transmission power is controlled. Step 1 is included only in the case where power control per CC (group) is performed.

Step 2: A transmission power of each antenna may be controlled as in the following options in consideration of a maximum transmission power of an antenna. The transmission power of an antenna may be controlled by applying the various methods (e.g. priority) described in Embodiment 1 and Embodiment 2.

Option 1: When a plurality of transmission antennas is used, precoding may be performed for transmission. In order for a receiving end to decode a precoded signal, the receiving end should perform decoding in reverse order of the transmitting end by recognizing a precoding matrix used in the transmitting end. However, if a power ratio of antennas is not maintained by power limitation of an antenna, distortion may occur in the precoding matrix applied from the transmitting end, thereby increasing an error rate. Accordingly, distortion of the precoding matrix can be prevented by adjusting a power of an antenna without a transmission power limitation at the same rate according to an antenna with a transmission power limitation. That is, a transmission power of an antenna which does not reach a maximum power limitation is reduced together with a transmission power of an antenna which exceeds a power limitation so that a transmission power ratio is maintained at the same level. If three or more antennas are present, according to a transmission power of an antenna reduced in the largest ratio, transmission powers of the other antennas may be adjusted at the same rate. In Option 1, an actually transmitted power $\hat{P}$ is as follows:

$$\hat{P}_{X-CH}^{artenna,n} = P_{X-CH}^{artenna,n}, \hat{P}_{X-CH}^{artenna,m} = P_{X-CH}^{artenna,m} \quad \text{[Equation 15]}$$

Equation 15 indicates an actual transmission power when there is no power limitation.

$$\hat{P}_{X-CH}^{artenna,n} = P_{Max}^{artenna,n}, \hat{P}_{X-CH}^{artenna,m} = (P_{Max}^{artenna,n}/P_{X-CH}^{artenna,n})P_{X-CH}^{artenna,m} \quad \text{[Equation 16]}$$

Equation 16 indicates an actual transmission power when there is a power limitation. Referring to Equation 16, since the sum of transmission powers of channels in an antenna n exceeds a maximum transmission power, an actual transmission power of the antenna n is limited to the maximum transmission power. Meanwhile, even if the sum of transmission powers of channels of an antenna m does not exceed a maximum transmission power, a transmission power of the antenna m is reduced in the ratio of $P_{Max}^{artenna,n}/P_{X-CH}^{artenna,n}$ so that the ratio of a transmission power to the antenna n is maintained.

Option 2: if a power ratio of each antenna indicated by a power control signal is not maintained due to a power limitation of any one antenna, distortion occurs in a precoding matrix applied from a transmitting end. If a receiving end does not recognize degree of distortion, a reception error rate is increased. However, when indirectly estimating the precoding matrix used in the transmitting end through a Dedicated Reference Signal (DRS), the receiving end may also estimate distortion of the precoding matrix according to variation of a transmission power ratio of an antenna. In this case, a transmission power of an antenna without a power limitation may not be lowered in order to control a transmission power ratio as in Option 1. Accordingly, only a transmission power of an antenna reaching a maximum power limitation may be transmitted by clipping a maximum transmission power of a corresponding antenna. A power used in actual transmission in Option 2 is as follows:

$$\hat{P}_{X-CH}^{artenna,n} = P_{X-CH}^{artenna,n}, \hat{P}_{X-CH}^{artenna,m} = P_{X-CH}^{artenna,m} \quad \text{[Equation 17]}$$

Equation 17 indicates an actual transmission power when there is no power limitation.

$$\hat{P}_{X-CH}^{artenna,n} = P_{Max}^{artenna,n}, \hat{P}_{X-CH}^{artenna,m} = P_{X-CH}^{artenna,m} \quad \text{[Equation 18]}$$

Equation 18 indicates an actual transmission power when there is a power limitation. Referring to Equation 18, since the sum of transmission powers of channels in an antenna n exceeds a maximum transmission power, an actual transmission power of the antenna n is limited to a maximum transmission power. Meanwhile since the sum of transmission powers of channels in an antenna m does not exceed the maximum transmission power, transmission is performed without power control.

Figure 12:
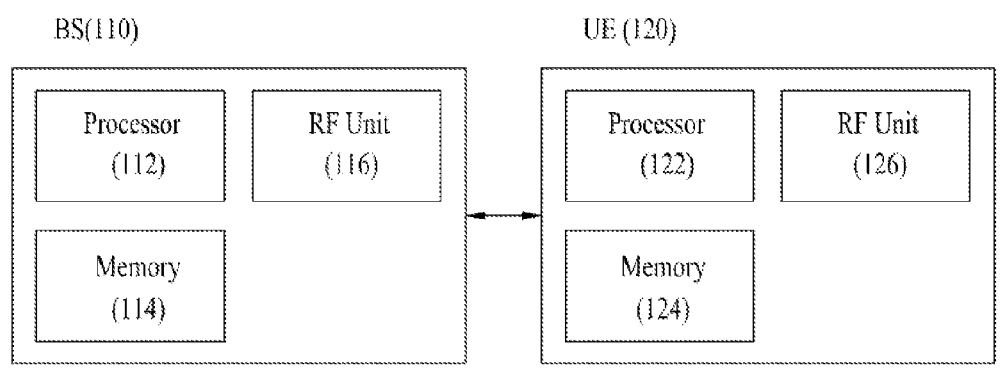
FIG. 12 illustrates a base station and a user equipment that are applicable to the embodiments of the present invention.

FIG. 12 illustrates a BS and a UE that are applicable to the embodiments of the present invention.

Referring to FIG. 12, a wireless communication system includes a BS 110 and a UE 120. In DL, a transmitter is a part of the BS 110 and a receiver is a part of the UE 120. In UL, the transmitter is a part of the UE 120 and the receiver is a part of the BS 110. The BS 110 includes a processor 112, a memory 114, and an RF unit 116. The processor 112 may be configured to implement the procedures and/or methods proposed in the present invention. The memory 114 is connected to the processor 112 and stores various information related to the operation of the processor 112. The RF unit 116 is connected to the processor 112 and transmits and receives radio signals. The UE 120 includes a processor 122, a memory 124, and an RF unit 126. The processor 122 may be configured to implement the procedures and/or methods proposed in the present invention. The memory 124 is connected to the processor 122 and stores various information related to the operation of the processor 122. The RF unit 126 is connected to the processor 122 and transmits and receives radio signals. The BS 110 and/or the UE 120 may include a single antenna or multiple antennas.

The above-described exemplary embodiments are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions of any one embodiment may be included in another embodiment and may be replaced with corresponding constructions of another embodiment. It is apparent that the embodiments may be constructed by a combination of claims which do not have an explicit cited relation in the appended claims or may include new claims by amendment after application.

In the present document, a description has been made of a data transmission and reception relationship between a UE and a BS. Here, a specific operation described as performed by the BS may be performed by an upper node of the BS. Namely, it is apparent that, in a network comprised of a plurality of network nodes including the BS, various operations performed for communication with the UE may be performed by the BS, or network nodes other than the BS. The term Bs may be replaced with the term fixed station, Node B, eNode B (eNB), access point, etc. The term UE may be replaced with the term Mobile Station (MS), Mobile Subscriber Station (MSS), etc.

The exemplary embodiments of the present invention may be achieved by various means, for example, hardware, firmware, software, or a combination thereof. In a hardware configuration, the exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the exemplary embodiments of the present invention may be achieved by a module, a procedure, a function, etc. performing the above-described functions or operations. Software code may be stored in a memory unit and executed by a processor. The memory unit may be located at the interior or exterior of the processor and may transmit and receive data to and from the processor via various known means.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention may be applied to a wireless communication system. Specifically, the present invention may be applied to a method and apparatus for controlling a UL transmission power.

What is claimed is:

1. A method for transmitting signals using a plurality of component carriers by a communication apparatus in a wireless communication system, the method comprising:
determining, per each of the component carriers, a transmission power of at least one channel for simultaneous transmission, in such a way that a total transmission power of the at least one channel does not exceed a maximum transmission power configured for a corresponding component carrier;
checking whether a total transmission power of a plurality of channels over the multiple component carriers for the simultaneous transmission exceeds a total maximum transmission power configured for the communication apparatus or not, the plurality of channels including a physical uplink control channel (PUCCH), a physical uplink shared channel (PUSCH) with uplink control information (UCI), and a PUSCH without the UCI; and
if the total transmission power of the plurality of channels over the multiple component carriers exceeds the total maximum transmission power configured for the communication apparatus, adjusting a transmission power of the PUSCH without the UCI from among the plurality of channels so that an adjusted total transmission power over the plurality of component carriers does not exceed the total maximum transmission power.

2. The method of claim 1, further comprising:
simultaneously transmitting the PUCCH and the PUSCH with the UCI via a first component carrier and the PUSCH without the UCI via a second component carrier.

3. The method of claim 1, wherein the adjusting includes reducing a transmission power of the PUSCH without the UCI using a transmission power attenuation coefficient.

4. The method of claim 1, wherein the adjusting includes adjusting a transmission power of the PUSCH without the UCI from among the plurality of channels while maintaining a transmission power of the PUCCH and a transmission power of the PUSCH with the UCI.

5. A method for transmitting signals using a plurality of component carriers by a communication apparatus in a wireless communication system, the method comprising:
determining, per each of the component carriers, a transmission power of at least one channel for simultaneous transmission, in such a way that a total transmission power of the at least one channel does not exceed a maximum transmission power configured for a corresponding component carrier;
checking whether a total transmission power of the plurality of channels over the plurality of component carriers for the simultaneous transmission exceeds a total maximum transmission power configured for the communication apparatus or not, the plurality of channels including a physical uplink shared channel (PUSCH) with uplink control information (UCI) and a PUSCH without the UCI; and
if the total transmission power of the plurality of channels over the plurality of component carriers exceeds the total maximum transmission power configured for the communication apparatus, adjusting a transmission power of the PUSCH without the UCI from among the plurality of channels so that an adjusted total transmission power over the plurality of component carriers does not exceed the total maximum transmission power.

6. The method of claim 5, further comprising:
simultaneously transmitting the PUSCH with the UCI via a first component carrier and the PUSCH without the UCI via a second component carrier.

7. The method of claim 5, wherein the adjusting includes reducing a transmission power of the PUSCH without the UCI using a transmission power attenuation coefficient.

8. The method of claim 5, wherein the adjusting includes adjusting a transmission power of the PUSCH without the UCI from among the plurality of channels while maintaining a transmission power of the PUSCH with the UCI.

9. A communication apparatus for transmitting signals using a plurality of component carriers in a wireless communication system, the communication apparatus comprising:
a processor configured to:
determine, per each of the component carriers, a transmission power of at least one channel for simultaneous transmission, in such a way that a total transmission power of the at least one channel does not exceed a maximum transmission power configured for a corresponding component carrier,
check whether a total transmission power of the plurality of channels over the plurality of component carriers for the simultaneous transmission exceeds a total maximum transmission power configured for the communication apparatus or not, the plurality of channels including a physical uplink control channel (PUCCH), a physical uplink shared channel (PUSCH) with uplink control information (UCI), and a PUSCH without the UCI, and
if the total transmission power of the plurality of channels over the plurality of component carriers exceeds the total maximum transmission power configured for the communication apparatus, adjust a transmission power of the PUSCH without the UCI from among the plurality of channels so that an adjusted total transmission power over the plurality of component carriers does not exceed the total maximum transmission power.

10. The communication apparatus of claim 9, further comprising:
a Radio Frequency (RF) unit configured to simultaneously transmit the PUCCH and the PUSCH with the UCI via a first component carrier and the PUSCH without the UCI via a second component carrier.

11. The communication apparatus of claim 9, wherein the processor is further configured to reduce a transmission power of the PUSCH without the UCI using a transmission power attenuation coefficient.

12. The communication apparatus of claim 9, wherein the processor is further configured to adjust a transmission power of the PUSCH without the UCI from among the plurality of channels while maintaining a transmission power of the PUCCH and a transmission power of the PUSCH with the UCI.

13. A communication apparatus for transmitting signals using a plurality of component carriers in a wireless communication system, the communication apparatus comprising:
a processor configured to:
determine, per each of the component carriers, a transmission power of at least one channel for simultaneous transmission, in such a way that a total transmission power of the at least one channel does not exceed a maximum transmission power configured for a corresponding component carrier,
check whether a total transmission power of the plurality of channels over the plurality of component carriers for the simultaneous transmission exceeds a total maximum transmission power configured for the communication apparatus or not, the plurality of channels including a physical uplink shared channel (PUSCH) with uplink control information (UCI) and a PUSCH without the UCI, and
if the total transmission power of the plurality of channels over the plurality of component carriers exceeds the total maximum transmission power configured for the communication apparatus, adjust a transmission power of the PUSCH without the UCI from among the plurality of channels so that an adjusted total transmission power over the plurality of component carriers does not exceed the total maximum transmission power.

14. The communication apparatus of claim 13, further comprising:
a Radio Frequency (RF) unit configured to simultaneously transmit the PUSCH with the UCI via a first component carrier and the PUSCH without the UCI via a second component carrier.

15. The communication apparatus of claim 13, wherein the processor is further configured to reduce a transmission power of the PUSCH without the UCI using a transmission power attenuation coefficient.

16. The communication apparatus of claim 13, wherein the processor is further configured to adjust a transmission power of the PUSCH without the UCI from among the plurality of channels while maintaining a transmission power of the PUSCH with the UCI.

* * * * *